United States Patent
Kroupa et al.

(10) Patent No.: US 10,711,184 B2
(45) Date of Patent: Jul. 14, 2020

(54) DOPED SEMICONDUCTORS AND METHODS OF MAKING THE SAME

(71) Applicants: Alliance for Sustainable Energy, LLC, Golden, CO (US); The Regents of the University of Colorado, Denver, CO (US)

(72) Inventors: Daniel McCray Kroupa, Seattle, WA (US); Barbara Katherine Hughes, Wheat Ridge, CO (US); Matthew C. Beard, Arvada, CO (US)

(73) Assignees: Alliance for Sustainable Energy, LLC, Golden, CO (US); The Regents of the University of Colorado, a body corporate, Denver, CO (US)

( * ) Notice: Subject to any disclaimer, the term of this patent is extended or adjusted under 35 U.S.C. 154(b) by 392 days.

(21) Appl. No.: 15/820,837

(22) Filed: Nov. 22, 2017

(65) Prior Publication Data

US 2018/0142145 A1   May 24, 2018

Related U.S. Application Data

(60) Provisional application No. 62/425,803, filed on Nov. 23, 2016.

(51) Int. Cl.
| | |
|---|---|
| C09K 11/06 | (2006.01) |
| B82Y 20/00 | (2011.01) |
| B82Y 40/00 | (2011.01) |

(52) U.S. Cl.
CPC .............. *C09K 11/06* (2013.01); *B82Y 20/00* (2013.01); *B82Y 40/00* (2013.01); *C09K 2211/10* (2013.01); *Y10S 977/774* (2013.01); *Y10S 977/825* (2013.01); *Y10S 977/896* (2013.01); *Y10S 977/95* (2013.01)

(58) Field of Classification Search
CPC .............. C09K 11/025; C09K 11/0811; C09K 11/0805; C09K 11/0883; B82Y 20/00; B82Y 40/00
See application file for complete search history.

(56) References Cited

PUBLICATIONS

Ahn, J. et al., "Nanoscale doping of compound semiconductors by solid phase dopant diffusion," Applied Physics Letters, vol. 108, 2016, pp. 122107-1 through 122107-4.

Amit, Y. et al., "From Impurity Doping to Metallic Growth in Diffusion Doping: Properties and Structure of Silver-Doped InAs Nanocrystals," ACS Nano, vol. 9, No. 11, 2015, pp. 10790-10800.
Anderson, N. et al., "Ligand Exchange and the Stoichiometry of Metal Chalcogenide Nanocrystals: Spectroscopic Observation of Facile Metal-Carboxylate Displacement and Binding," Journal of the American Chemical Society, vol. 135, 2013, pp. 18536-18548.
Aqili, A. et al., "Optical and structural properties of silver doped ZnSe thin films prepared by CSS and ion exchange process," Proceedings of SPIE, vol. 8470, 2012, pp. 84700H-1-84700H-8.
Buonsanti, R. et al., "Chemistry of Doped Colloidal Nanocrystals," ACS Chemistry of Materials, vol. 25, 2013, pp. 1305-1317.
Choi, H. et al., "Steric-Hindrance-Driven Shape Transition in PbS Quantum Dots: Understanding Size-Dependent Stability," Journal of the American Chemical Society, vol. 135, 2013, pp. 5278-5281.
Cragg, G. et al., "Suppression of Auger Processes in Confined Structures," NanoLetters, vol. 10, 2010, pp. 313-317.
Diaconescu, B. et al., "Measurement of Electronic States of PbS Nanocrystal Quantum Dots Using Scanning Tunneling Spectroscopy: The Role of Parity Selection Rules in Optical Absorption," Physical Review Letters, vol. 110, Mar. 22, 2013, pp. 127406-1 through 127406-5.
Efros, Alexander et al., "Origin and control of blinking in quantum dots," Nature Nanotechnology; vol. 11, Aug. 3, 2016, pp. 661-671.
Federovich, N.A., "Diffusion of Silver and Sodium in Lead Selenide," Soviet Physics—Solid State, vol. 7, No. 5, Nov. 1965, pp. 1289-1290.
Hughes, B. et al., "Control of PbSe Quantum Dot Surface Chemistry and Photophysics Using an Alkylselenide Ligand," ACS Nano, vol. 6, No. 6, 2012, pp. 5498-5506.
Kang, I. et al., "Electronic structure and optical properties of PbS and PbSe quantum dots," Journal of the Optical Society of America B, vol. 14, No. 7, Jul. 1997, pp. 1632-1646.
Kang, M. et al., "Influence of Silver Doping on Electron Transport in Thin Films of PbSe Nanocrystals," Advanced Materials, Materials Views, vol. 25, 2013, pp. 725-731.
Kohn, S. et al., "Electronic Band Structure and Optical Properties of PbTe, PbSe, and PbS," Physical Review B, vol. 8, No. 4, Aug. 15, 1973, pp. 1477-1488.
Kubaschewski, O. and Msit, "Ag—Pb—Se Ternary Phase Diagram Evaluation," Springer Nature, http://materials.springer.com/msi/docs/sm_msi_r_10_010884_10, Jan. 4, 2018, 18 pages.

(Continued)

*Primary Examiner* — C. Melissa Koslow
(74) *Attorney, Agent, or Firm* — Michael A. McIntyre

(57) ABSTRACT

The present disclosure relates to a composition that includes a first element, a second element, a third element, a ligand, and an anion, where the first element and the second element form a nanocrystal that includes a surface and a crystal lattice, a first portion of the third element covers at least a second portion of the surface in the form of a layer, a third portion of the third element is incorporated into the crystal lattice, and the ligand and the anion are ionically bound to at least one of the second element and/or the first portion of the third element.

17 Claims, 36 Drawing Sheets

(56) References Cited

PUBLICATIONS

Miller, E. et al., "Revisiting the Valence and Conduction Band Size Dependence of PbS Quantum Dot Thin Films," ACS Nano, vol. 10, 2016, pp. 3302-3311.

Mocatta, D. et al., "Heavily Doped Semiconductor Nanocrystal Quantum Dots," Science, vol. 332, Apr. 1, 2011, pp. 77-81.

Moreels, I. et al., "Surface Chemistry of Colloidal PbSe Nanocrystals," Journal of the American Chemical Society, vol. 130, 2008, pp. 15081-15086.

Norris, D. et al., "Measurement and assignment of the size-dependent optical spectrum in CdSe quantum dots," American Physical Society, Physical Review B, vol. 53, No. 24, Jun. 15, 1996, pp. 16338-16345.

Oh, S. et al., "Stoichiometric Control of Lead Chalcogenide Nanocrystal Solids to Enhance Their Electronic and Optoelectronic Device Performance," ACS Nano, vol. 7, No. 3, 2013, pp. 2413-2421.

Owen, J., "The coordination chemistry of nanocrystal surfaces," Science, vol. 347, Issue 6222, Feb. 6, 2015, pp. 615-616.

Peng, H. et al., "Electronic structure and transport properties of doped PbSe," American Physical Society, Physical Review B, vol. 84, 2011, pp. 125207-1 through 125207-13.

Perkins, C. et al., "Surfactant-assisted growth of CdS thin films for photovoltaic applications," American Vacuum Society, Journal of Vacuum Science Technology A: Vacuum, Surfaces, and Films, 24, vol. 3, May/Jun. 2006, pp. 497-504.

Sahu, A. et al., "Facile Synthesis of Silver Chalcogenide ($Ag_2E$; E=Se, S, Te) Semiconductor Nanocrystals," Journal of the American Chemical Society, vol. 133, 2011, pp. 6509-6512.

Sahu, A. et al., "Quantum confinement in silver selenide semiconductor nanocrystals," Royal Society of Chemistry, Chemical Communications, vol. 48, 2012, pp. 5458-5460.

Sahu, A. et al., "Electronic Impurity Doping in CdSe Nanocrystals," ACS Nano Letters, vol. 12, 2012, pp. 2587-2594.

Seltzer, M. et al., "Self-Diffusion of Lead-210 in Single Crystals of Lead Selenide," Journal of Chemical Physics, vol. 36, No. 1, Jan. 1, 1962, pp. 130-134.

Semonin, O. et al., "Absolute Photoluminescence Quantum Yields of IR-26 Dye, PbS, and PbSe Quantum Dots," Journal of Physical Chemistry Letters, vol. 1, 2010, pp. 2445-2450.

Smith, D. et al., "Tuning the Synthesis of Ternary Lead Chalcogenide Quantum Dots by Balancing Precursor Reactivity," ACS Nano, vol. 5, No. 1, 2011, pp. 183-190.

Stavrinadis, A. et al., "Heterovalent cation substitutional doping for quantum dot homojunction solar cells," Nature Communications, DOI: 10.1038/ncomms3981; Dec. 18, 2013, 7 pages.

Stavrinadis, A. et al., "Aliovalent Doping in Colloidal Quantum Dots and Its Manifestation on Their Optical Properties: Surface Attachment versus Structural Incorporation," ACS Chemical of Materials, vol. 28, 2016, pp. 5384-5393.

Trizio, L. et al., "Forging Colloidal Nanostructures via Cation Exchange Reactions," ACS Chemical Reviews, vol. 116, 2016, pp. 10852-10887.

Vlaskin, V. et al., "Nanocrystal Diffusion Doping," Journal of the American Chemical Society, vol. 135, 2013, pp. 14380-14389.

Wang, S. et al., "Exploring the doping effects of Ag in p-type PbSe compounds with enhanced thermoelectric performance," Journal of Physics D: Applied Physics, vol. 44, 2011, 8 pages.

Wills, A. et al., "Synthesis and characterization of Al- and In-doped CdSe nanocrystals," Journal of Materials Chemistry, vol. 22, 2012, pp. 6335-6342.

Zembutsu, S., "X-ray photoelectron spectroscopy studies of Ag photodoping in Se—Ge amorphous films," Applied Physics Letters, vol. 39, No. 12, Dec. 15, 1981, pp. 969-971.

Zhang, J. et al., "Preparation of Cd/Pb Chalcogenide Heterostructured Janus Particles via Controllable Cation Exchange," ACS Nano, vol. 9, No. 7, 2015, pp. 7151-7163.

Scheme 1

Scheme 2

DOPED SEMICONDUCTORS AND METHODS OF MAKING THE SAME

CROSS-REFERENCE TO RELATED APPLICATIONS

This application claims the benefit of U.S. Provisional Application No. 62/425,803 filed Nov. 23, 2016, the contents of which are incorporated herein by reference in their entirety.

CONTRACTUAL ORIGIN

The United States Government has rights in this disclosure under Contract No. DE-AC36-08GO28308 between the United States Department of Energy and the Alliance for Sustainable Energy, LLC, the Manager and Operator of the National Renewable Energy Laboratory.

BACKGROUND

The intentional introduction of impurity atoms that inject free charge carriers into the electronic bands of a host semiconductor at equilibrium, also known as electronic impurity doping, has been essential to the growth and development of semiconductor based technologies including energy technologies such as solar cells, LEDs, and thermoelectrics. Ideally, doping does not modify the electronic or physical structure of a semiconductor, but only changes its ability to conduct electrons or holes (negative or positive charge). In a bulk semiconductor, addition of impurity atoms can result in a shallow donor level below the conduction band and when ionized can lead to a shift of the Fermi level towards the conduction band, producing an n-type semiconductor. Ionization of a shallow acceptor level above the valence band, on the other hand, can shift the Fermi-level towards the valence band, producing a p-type semiconductor. Traditional methods of electronic impurity doping bulk semiconductors, including Si and GaAs, often involve techniques such as growth addition, high temperature ion diffusion, and ion implantation. However, reliable methods for controlling impurity doping within quantum-confined semiconductors are not readily available for a large range of semiconductor nanocrystal systems.

SUMMARY

An aspect of the present disclosure is a composition that includes a first element, a second element, a third element, a ligand, and an anion, where the first element and the second element form a nanocrystal that includes a surface and a crystal lattice, a first portion of the third element covers at least a portion of the surface in the form of a layer, a second portion of the third element is incorporated into the crystal lattice, and the ligand and the anion are ionically bound to at least one of the second element and/or the first portion of the third element.

In some embodiments of the present disclosure, the first element may include at least one of selenium, sulfur, tellurium, arsenic, phosphorous, nitrogen, and/or antimony. In some embodiments of the present disclosure, the second element may include at least one of lead, cadmium, indium, gallium, tin, zinc, and/or mercury. In some embodiments of the present disclosure, the nanocrystal may include at least one of lead selenide, lead sulfide, lead telluride, cadmium sulfide, cadmium selenide, cadmium telluride, indium phosphide, indium nitride, indium arsenide, indium antimonide, zinc sulfide, zinc selenide, zinc telluride, mercury sulfide, mercury selenide, and/or mercury telluride. In some embodiments of the present disclosure, the crystal lattice may include at least one of a rock salt unit cell, a wurzite unit cell, a zinc blende unit cell, and/or a sphalerite unit cell. In some embodiments of the present disclosure, the third element may include at least one of silver, sodium, potassium, rubidium, magnesium, calcium, strontium, copper, gold, zinc, cadmium, mercury, gallium, indium, thallium, germanium, and/or silicon.

In some embodiments of the present disclosure, the layer may have a thickness of about a monolayer thickness of the third element. In some embodiments of the present disclosure, the first portion of the third element may be present on the surface at a first concentration between greater than 0 mol % and 30 mol %. In some embodiments of the present disclosure, the second portion of the third element may be present in the nanocrystal at a second concentration between greater than 0 mol % and 0.5 mol %. In some embodiments of the present disclosure, the nanocrystal may have an average diameter between 2 nm and 40 nm. In some embodiments of the present disclosure, the average diameter may be between about 3 nm and 15 nm. In some embodiments of the present disclosure, the anion may include at least one of a nitrate, phosphate, chloride, iodide, bromide, sulfate, sulfite, nitrite, chlorite, acetate, formate, hydroxide, perchlorate, chlorate, thiosulfate, phosphite, carbonate, hydrogen carbonate, oxalate, cyanate, cyanide, isocyanate, thiocyanate, chromate, dichromate, permanganate, tetrafluoroborate, and/or citrate.

In some embodiments of the present disclosure, the anion may be present at a first surface coverage between greater than zero anion/nm$^2$ and 3.5 anions/nm$^2$. In some embodiments of the present disclosure, the ligand may include at least one of oleate, myristate, cinnamate, stearate, oleylamine, trioctylphosphine, and/or trioctylphosphine oxide. In some embodiments of the present disclosure, the ligand may be present at a second surface coverage between 0.1 ligands/nm$^2$ and 4.0 ligands/nm$^2$. In some embodiments of the present disclosure, the nanocrystal may exhibit a Fermi level shift towards a valence band maximum and/or towards a conduction band minimum with an increased incorporation of the third element, as measured by XPS/UPS. In some embodiments of the present disclosure, the nanocrystal absorbance may exhibit an increasing bleach of a first exciton transition and a growth of a low-energy intraband transition with an increased incorporation of the third element, as measured by at least one of UV-Vis and/or FTIR absorbance. In some embodiments of the present disclosure, the nanocrystal may have a characteristic length between 0.5 nm and 100 nm.

An aspect of the present disclosure is a composition that includes a nanocrystal that includes PbSe having a surface and a rock salt crystal lattice, a layer that includes silver and/or indium at least partially covering the surface, and an anion that includes at least one of a nitrate, phosphate, chloride, iodide, bromide, sulfate, sulfite, nitrite, chlorite, acetate, formate, hydroxide, perchlorate, chlorate, thiosulfate, phosphite, carbonate, hydrogen carbonate, oxalate, cyanate, cyanide, isocyanate, thiocyanate, chromate, dichromate, permanganate, tetrafluoroborate, and/or citrate. The composition further includes a ligand that includes at least one of oleate, myristate, cinnamate, stearate, oleylamine, trioctylphosphine, and/or trioctylphosphine oxide, where the ligand and the anion are ionically bound to at least the layer, the nanocrystal has a characteristic length between 3 nm and 10 nm, a concentration of at least one of silver and/or indium is present in the crystal lattice between greater than 0 mol % and 0.5 mol %, and the concentration is present in the form of at least one of silver cations and/or indium cations. In some embodiments of the present disclosure, the ligand may include oleate at a surface coverage between 0.5 ligands/nm$^2$ and 4.0 ligands/nm$^2$.

BRIEF DESCRIPTION OF THE DRAWINGS

Exemplary embodiments are illustrated in referenced figures of the drawings. It is intended that the embodiments and figures disclosed herein are to be considered illustrative rather than limiting.

| REFERENCE NUMBERS | |
|---|---|
| 100 | starting nanocrystal |
| 110 | surface |
| 120 | internal core |
| 130 | surface ligand |
| 140 | first element |
| 150 | second element |
| 200 | doped nanocrystal |
| 210 | surface |
| 220 | third element |
| 230 | layer |
| 240 | anion |

DETAILED DESCRIPTION

The present disclosure may address one or more of the problems and deficiencies of the prior art discussed above. However, it is contemplated that some embodiments as disclosed herein may prove useful in addressing other problems and deficiencies in a number of technical areas. Therefore, the embodiments described herein should not necessarily be construed as limited to addressing any of the particular problems or deficiencies discussed herein.

The present disclosure relates to electronic impurity doping of colloidal PbSe nanocrystals using a post-synthetic cation exchange reaction in which $Pb^{2+}$ cations are exchanged for $Ag^+$ cations where varying the concentration of dopant ions exposed to the as-synthesized PbSe nanocrystals controls the extent of exchange. The electronic impurity doped nanocrystals exhibit the fundamental spectroscopic signatures associated with injecting a free charge carrier into a nanocrystal under equilibrium conditions, including a bleach of the first exciton transition and the appearance of a quantum-confined, low-energy intraband absorption feature. Photoelectron spectroscopy confirms that $Ag^+$ acts as a p-type dopant for PbSe nanocrystals and is consistent with k·p calculations of the size-dependent intraband transition energy. In some embodiments of the present disclosure, bleaching the first exciton transition by an average of 1 carrier per nanocrystal was accomplished by the replacement of approximately 10% of the $Pb^{2+}$ with $Ag^+$. In some embodiments, the majority of incorporated $Ag^+$ remains at the nanocrystal surface and does not interact with the core electronic states of the nanocrystal. In some embodiments of the present disclosure, a nanocrystal may be a quantum dot, wherein a quantum dot as defined herein is a quantum-confined semiconductor nanocrystal. In some embodiments of the present disclosure, a quantum dot may be in a spherical form and/or any other suitable form; e.g. cubes, stars, rods, octahedrons, etc.

Figure 1:
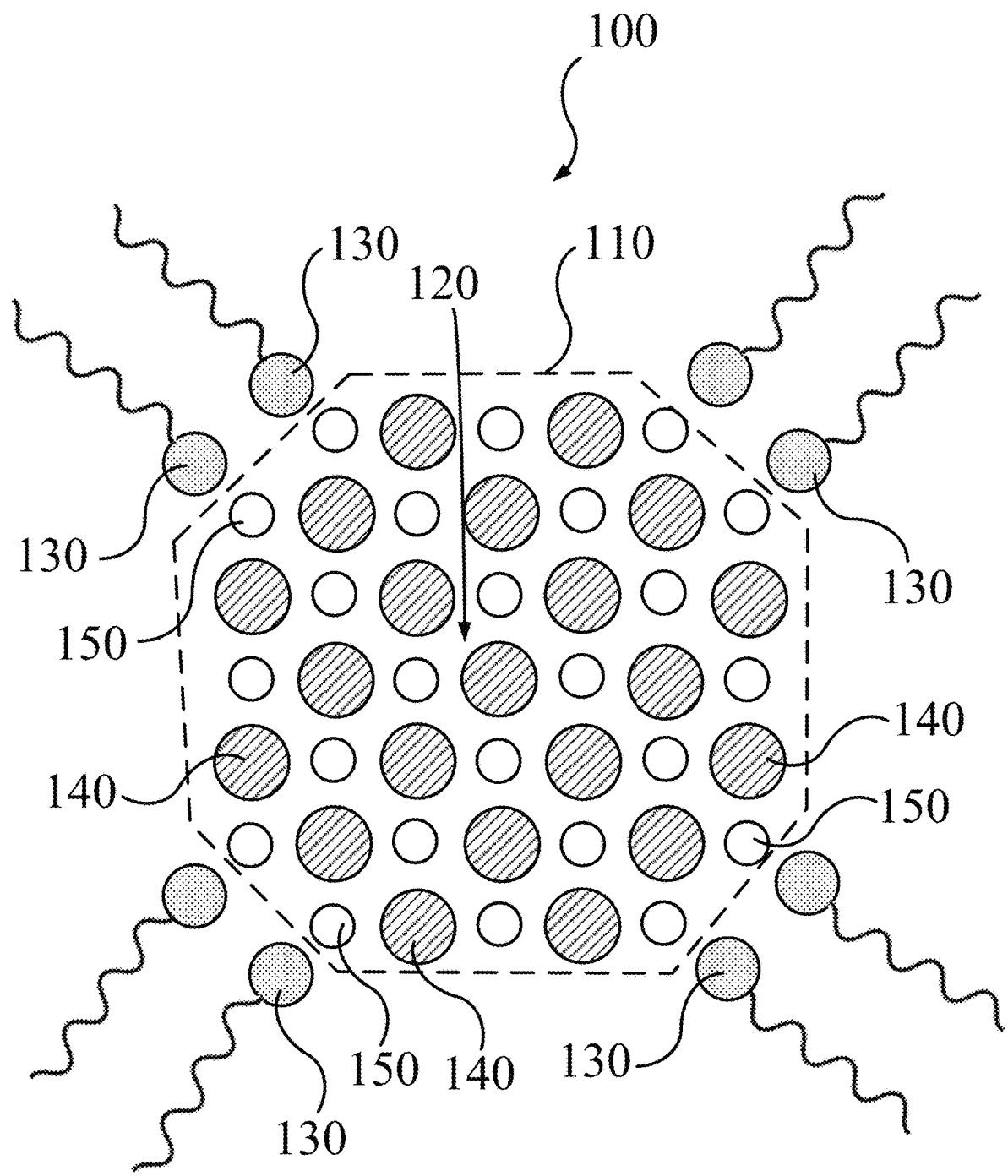
FIG. 1 illustrates a cross-sectional view of a starting nanocrystal, according to some embodiments of the present disclosure.

FIG. 1 illustrates a cross-sectional view of a starting nanocrystal 100 (e.g. quantum dot), according to some embodiments of the present disclosure. The starting nanocrystal 100 includes an internal core 120 constructed of a crystal lattice of a first element 140 and a second element 150. The starting nanocrystal 100 also includes a surface 110 to which a plurality of surface ligands 130 are associated; e.g. by ionic interactions. In some embodiments of the present disclosure, the first element 140 may include at least one of selenium, sulfur, tellurium, arsenic, phosphorous, nitrogen, and/or antimony. In some embodiments of the present disclosure, the first element 140 may include selenium. The first element 140 may create a crystal lattice with the second element 150, which may include at least one of lead, cadmium, indium, gallium, tin, zinc, and/or mercury. In some embodiments of the present disclosure, the second element 150 may include lead. Thus, a starting nanocrystal 100 may include a semiconductor that includes at least one of lead selenide, lead sulfide, lead telluride, cadmium sulfide, cadmium selenide, cadmium telluride, indium phosphide, indium nitride, indium arsenide, indium antimonide, zinc sulfide, zinc selenide, zinc telluride, mercury sulfide, mercury selenide, and/or mercury telluride. In some embodiments of the present disclosure, the starting nanocrystal 100 may include lead selenide.

Further, the starting nanocrystal 100, and the crystal lattice, may be have a unit cell structure of at least one of a rock salt unit cell, a wurzite unit cell, a zinc blende unit cell, and/or a sphalerite unit cell. In some embodiments of the present disclosure, the starting nanocrystal 100 may have a unit cell structure of rock salt. A starting nanocrystal 100 may have an average width dimension between about 2 nm and about 40 nm. In some embodiments of the present disclosure, a starting nanocrystal 100 may have an average width dimension between about 3 nm and about 15 nm. As used herein, the term "about" refers to the probability of error present in any measurement. A surface ligand 130 associated with the surface 110 of the starting nanocrystal 100 may include at least one of an oleate, myristate, cinnamate, stearate, oleylamine, trioctylphosphine, thiolate, and/or trioctylphosphine oxide. In some embodiments of the present disclosure, a surface ligand 130 may include an oleate. In some embodiments of the present disclosure, a surface ligand 130 may be ionically associated with the surface 110 of the starting nanocrystal 100.

Figure 2:
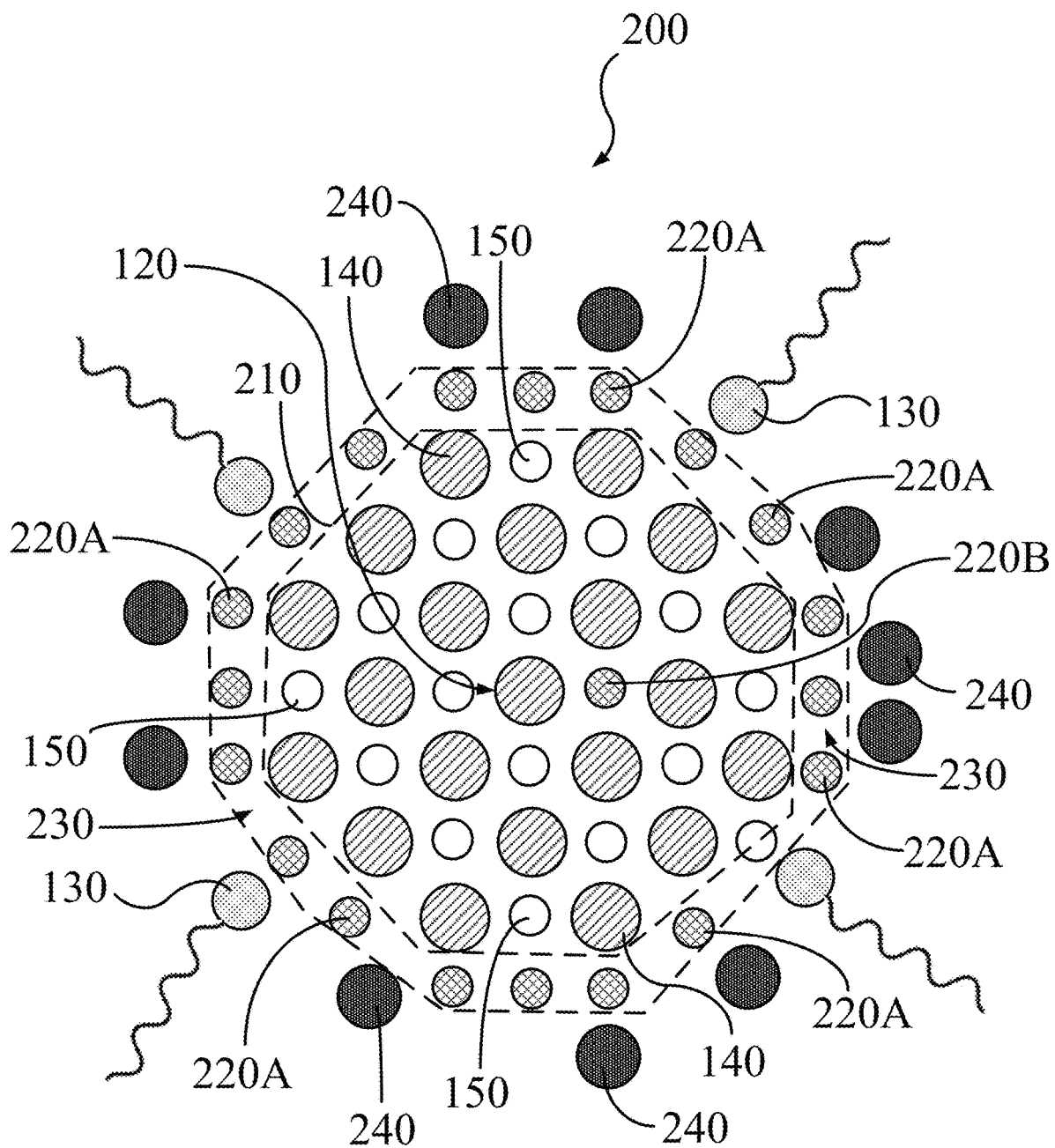
FIG. 2 illustrates a cross-sectional view of a doped nanocrystal, according to some embodiments of the present disclosure.

A starting nanocrystal 100, similar to that shown in FIG. 1, may be treated such that the starting nanocrystal 100 may be converted to a doped nanocrystal 200 as illustrated in FIG. 2. In some embodiments of the present disclosure, a doped nanocrystal 200 may include a layer 230 of a third element 220, where the layer 230 may at least partially cover a surface 210 of the doped nanocrystal 200. In some embodiments of the present disclosure, the surface 210 of the doped nanocrystal 200 may be substantially the same as the surface 110 of the starting nanocrystal 100. In some embodiments of the present disclosure, the surface 210 of the doped nanocrystal 200 may be substantially different than the surface 110 of the starting nanocrystal 100. The third element 220 may include at least one of silver, sodium, potassium, rubidium, magnesium, calcium, strontium, copper, gold, zinc, cadmium, mercury, gallium, indium, thallium, germanium, and/or silicon. In some embodiments, the third element 220 may include silver. In some embodiments of the present disclosure, the layer 230 may have a thickness of about one atomic monolayer of the third element 220. The layer 230 may substantially cover the entire surface 210 of the doped nanocrystal 200, or the layer 230 may only partially cover the surface 210. In some embodiments of the present disclosure, the layer 230 may cover substantially all of the surface 210 of the doped nanocrystal 200 and the layer 230 may have an average thickness of greater than an atomic monolayer of the third element 220.

In some embodiments of the present disclosure, a first portion of the third element 220 may form the layer 230 that at least partially covers the surface 210 of the doped nanocrystal 200, while a second portion of the third element 220 may be incorporated into the internal core 120 of the doped nanocrystal 200. For example, as shown in FIG. 2, a first portion of the third element 220A may form a layer 230, while a second portion of the third element 220B may be incorporated into the crystal lattice of the internal core 120 of the doped nanocrystal 200. In some embodiments of the present disclosure, the first portion of the third element 220A may be present at a first atomic percentage between greater than about 0% and about 30% of the doped nanocrystal 200. In some embodiments of the present disclosure, the second portion of the third element 220B may be present at a second atomic percentage between greater than about 0% and about 1.0% of the doped nanocrystal 200. These percentages are on a surface ligand and anion free basis.

At least a portion of the surface ligands 130 initially present on the starting nanocrystal 100 (see FIG. 1) may be associated with the layer 230 and/or surface 210 of the doped nanocrystal 200. In some embodiments of the present disclosure, the surface ligands 130 may be present on the doped nanocrystal 200 at a first surface concentration between about 0.5 surface ligands per square nanometer and about 4.0 surface ligands per square nanometer. The doped nanocrystal 200 may also have anions 240 associated with the layer 230 and/or the surface 210 of the doped nanocrystal 200. Anions 240 associated with the layer 230 and/or the surface 210 of the doped nanocrystal 200 include at least one of a nitrate, phosphate, chloride, iodide, bromide, sulfate, sulfite, nitrite, chlorite, acetate, formate, hydroxide, perchlorate, chlorate, thiosulfate, phosphite, carbonate, hydrogen carbonate, oxalate, cyanate, cyanide, isocyanate, thiocyanate, chromate, dichromate, permanganate, tetrafluoroborate, and/or citrate. In some embodiments of the present disclosure, the anion 240 may be present on the layer 230 and/or surface 210 of the dope nanocrystal 200 at a second surface concentration between greater than zero anions per square nanometer and about 4 anions per square nanometer.

EXPERIMENTAL EXAMPLES

Cation exchange reaction and physical characterization: Doped PbSe (selenide the first element; lead the second element) nanocrystals were doped with $Ag^+$ (the third element) via a partial cation exchange reaction from starting PbSe nanocrystals. The doped PbSe nanocrystals were formed by dissolving $AgNO_3$ (concentrations ranging 5-35% Ag:Pb) in ethanol, and the resultant solution was then pipetted into stirred solutions of starting PbSe nanocrystals in hexane at room temperature. The exchange of lead for silver was allowed to proceed for about ten minutes at which time the reaction was quenched by precipitating the doped Ag:PbSe nanocrystals with ethanol, and the doped Ag:PbSe nanocrystals were recovered by centrifugation. The doped Ag:PbSe nanocrystals were further purified by additional steps of precipitation/centrifugation/and re-dissolution using hexane and ethanol as the solvent/antisolvent pair. Purified doped Ag:PbSe nanocrystals were stored either as a powder or re-suspended in hexane for film formation or in tetrachloroethylene for optical characterization. The concentration of $Ag^+$ dopant atoms (the third element) exposed to the starting nanocrystals was based on an estimation of the total starting lead content per starting nanocrystal, but the final dopant incorporation was measured using analytical techniques. All labeling of doped Ag:PbSe nanocrystals throughout this disclosure are reported as the $Ag^+$ content incorporated into the nanocrystals based on the trends determined from elemental analysis.

Figure 3A:
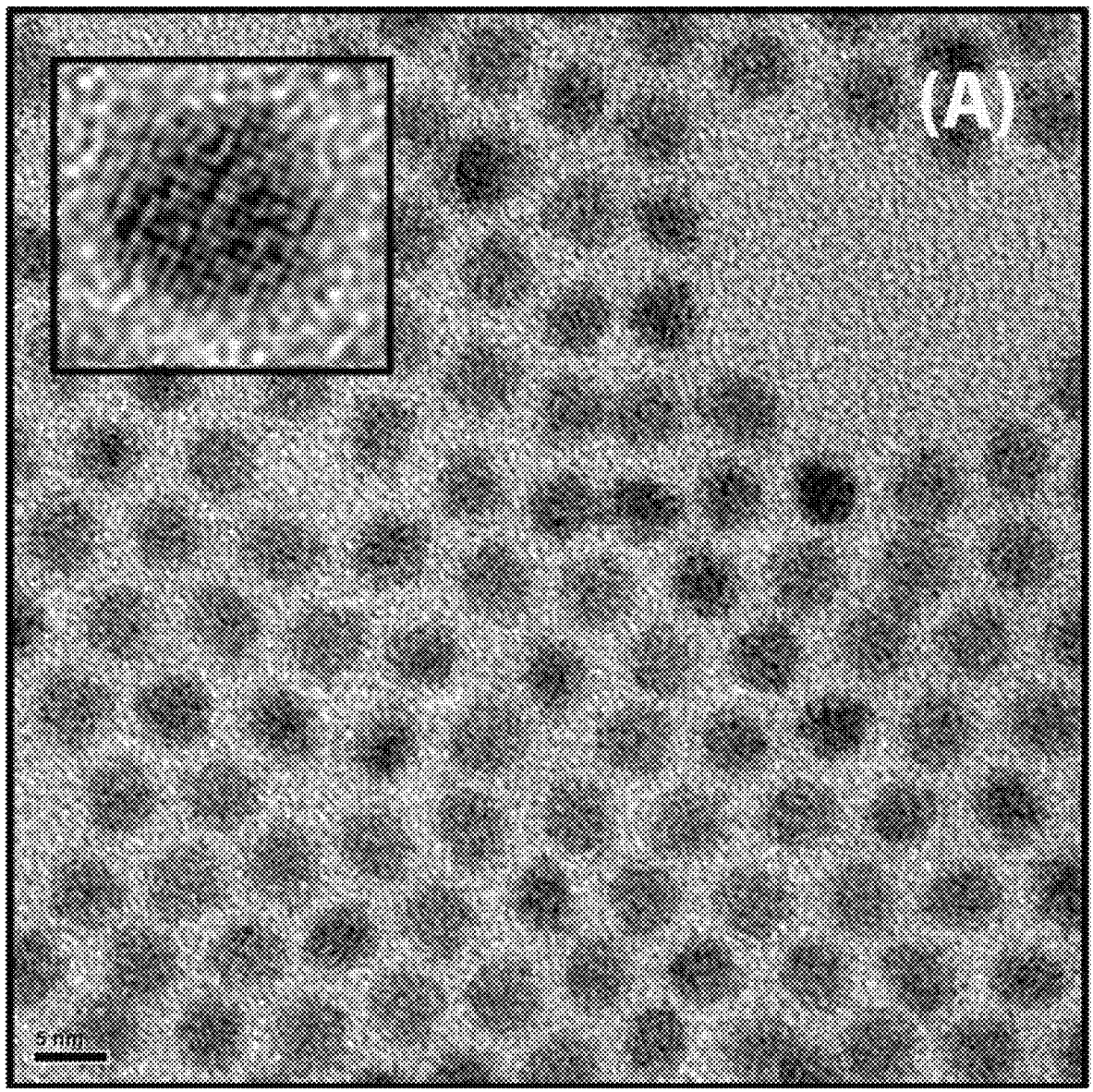
FIGS. 3A and 3B illustrate TEM images showing slightly increased nanocrystal aggregation with increasing dopant levels for as starting 4.7 nm PbSe nanocrystals (FIG. 3A) and 24.3% doped 4.7 nm Ag:PbSe nanocrystals (FIG. 3B), according to some embodiments of the present disclosure. Scale bars are 5 nm. Insets show high resolution TEM images.
Figure 3B:
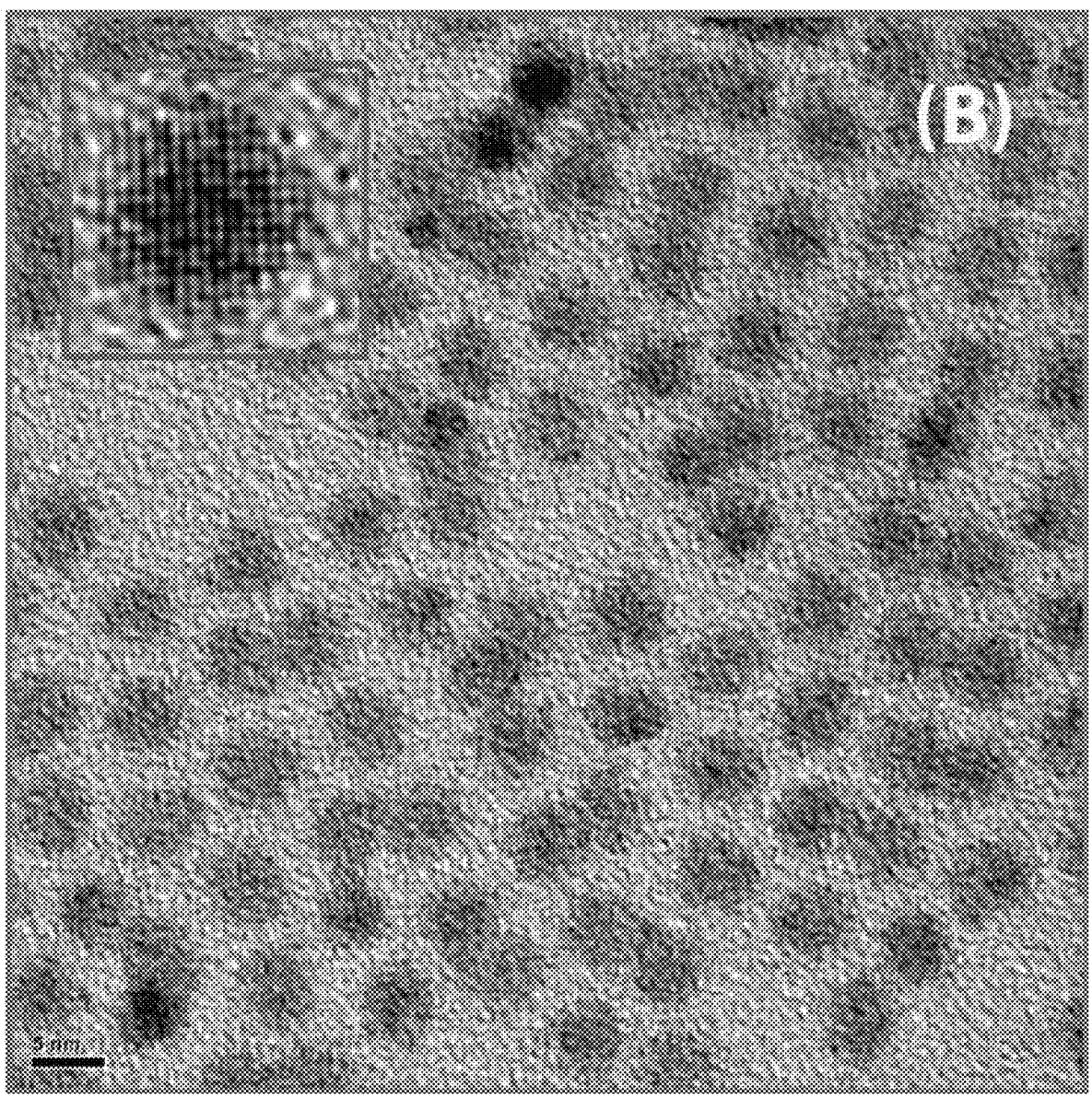
Figure 3C:
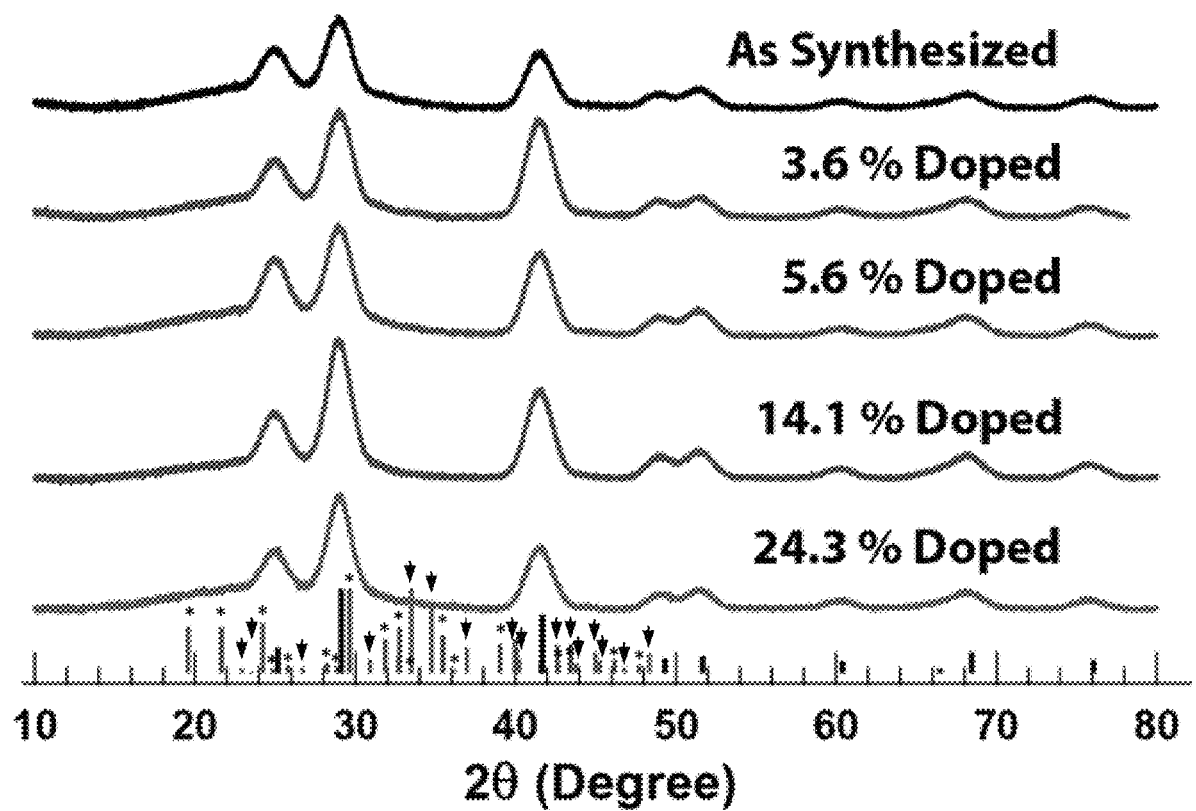
FIG. 3C illustrates XRD patterns of 4.7 nm doped Ag:PbSe nanocrystals, according to some embodiments of the present disclosure. Stick diagrams for PbSe (unmarked), Ag$_2$Se (indicated by arrows), and AgNO$_3$ (indicated by asterisks) are included as references.
Figure 3D:
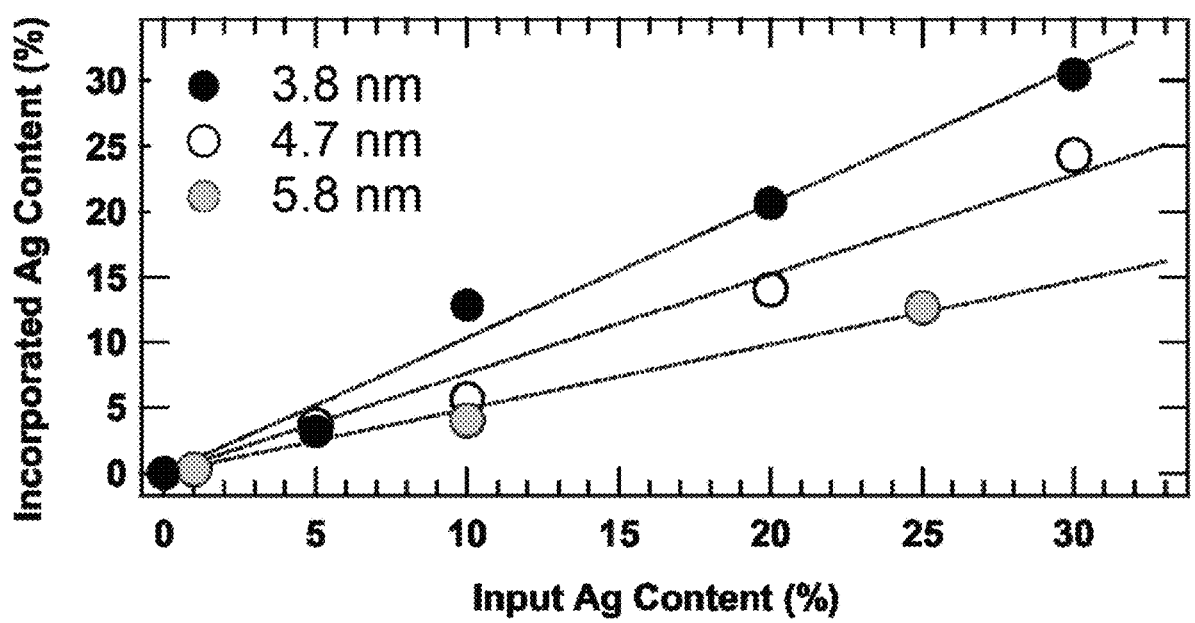
FIG. 3D illustrates elemental analysis data showing the amount of Ag$^+$ atoms incorporated into doped Ag:PbSe nanocrystals relative to the amount of Ag$^+$ added to the exchange solution, according to some embodiments of the present disclosure.

TEM images illustrated in FIGS. 3A and 3B indicate increased nanoparticle aggregation with increasing $AgNO_3$/ethanol addition, but passing doped Ag:PbSe nanocrystal solutions through a 0.2 µm PTFE filter removed larger aggregates. X-ray diffraction (XRD) measurements of thin films of doped Ag:PbSe nanocrystals containing 3.6% to 24.3% incorporated $Ag^+$ were taken and determined that the dopants (the third element) did not fundamentally alter the crystal structure of starting PbSe nanocrystals. The XRD patterns shown in FIG. 3C confirm that upon exchange, the doped Ag:PbSe nanocrystals retained the PbSe rocksalt crystallographic structure. Furthermore, there were no signatures of residual crystalline $AgNO_3$ or $Ag_2Se$ in either the tetrahedral or orthorhombic phases. Elemental analysis, specifically X-ray fluorescence (XRF) or inductively-coupled mass spectrometry (ICP-MS), revealed that the incorporation of $Ag^+$ ions in the doped Ag:PbSe nanocrystals after purification is size-dependent where $Ag^+$ more easily incorporated into smaller nanocrystals (see FIG. 3D). This may be a result of improved $Ag^+$ binding to the PbSe nanocrystal <111> facets, which are more pronounced in PbSe nanocrystals with smaller diameters. The results presented herein illustrate that $Ag^+$ incorporates into PbSe nanocrystals efficiently. For example, for 4.7 nm PbSe nanocrystals, the ratio of input $Ag^+$ to incorporated $Ag^+$ was approximately 2, that is, 10% (Ag:Pb) input produced 5% (Ag:Pb) incorporation. It should be noted, that the methods described above for forming doped Ag:PbSe nanocrystals was performed in the absence of a mediating compound, for example trioctylphosphine(TOP) or oleylamine, in the $AgNO_3$/alcohol solution.

Figure 4A:
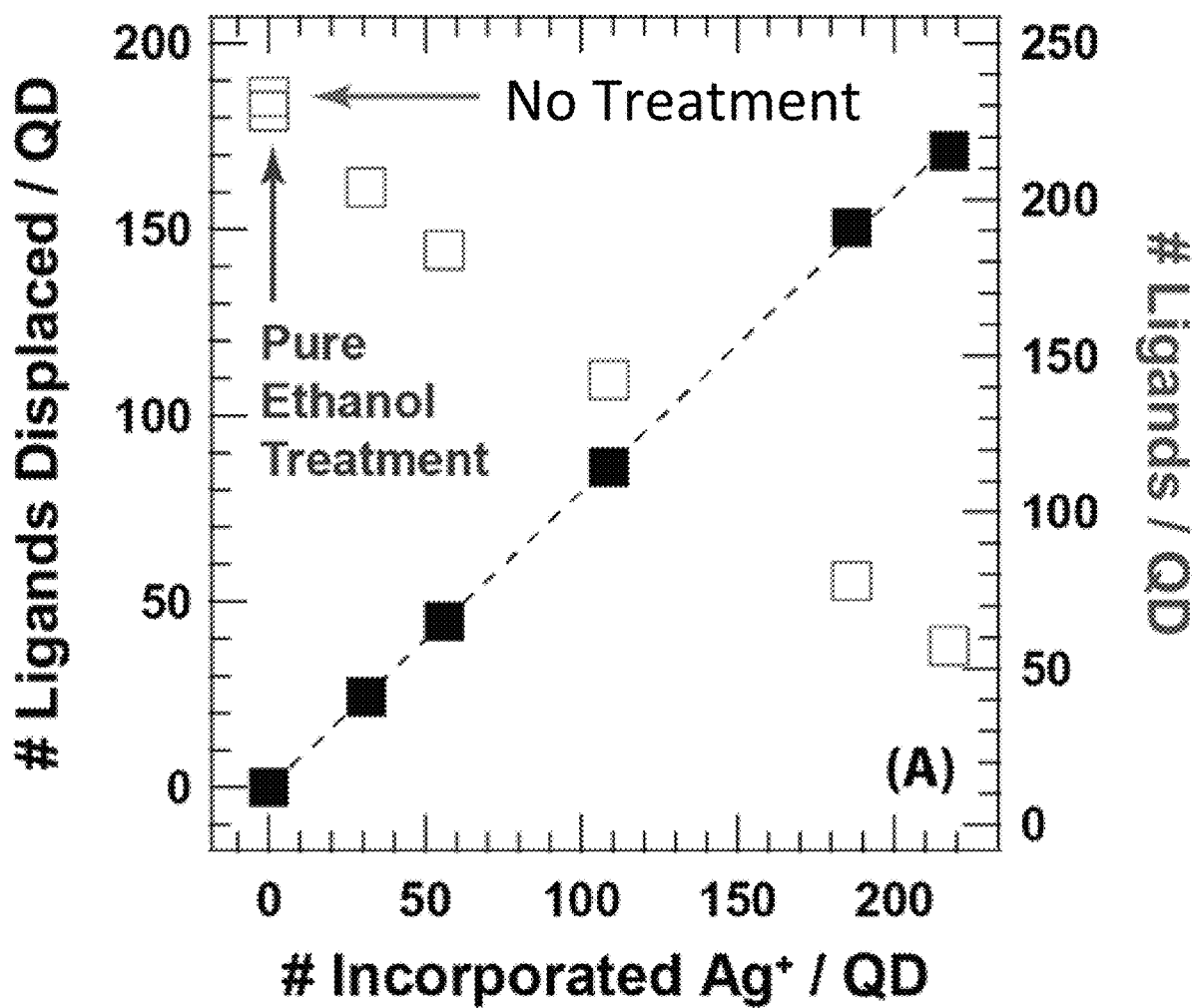
FIG. 4A illustrates that the number of bound oleate surface ligands per nanocrystal decreases as nanocrystal Ag$^+$ content increases suggesting a ligand mediated cation exchange mechanism, according to some embodiments of the present disclosure. The data set marked with the empty square symbols are the number of ligands per nanocrystal while the solid squares are the # of ligands displaced per nanocrystal for the various doped Ag:PbSe nanocrystals. The as-synthesized nanocrystals without any treatments and the PbSe nanocrystals that were exposed to a similar volume of pure ethanol as those that are doped are indicated with arrows.
Figure 4B:
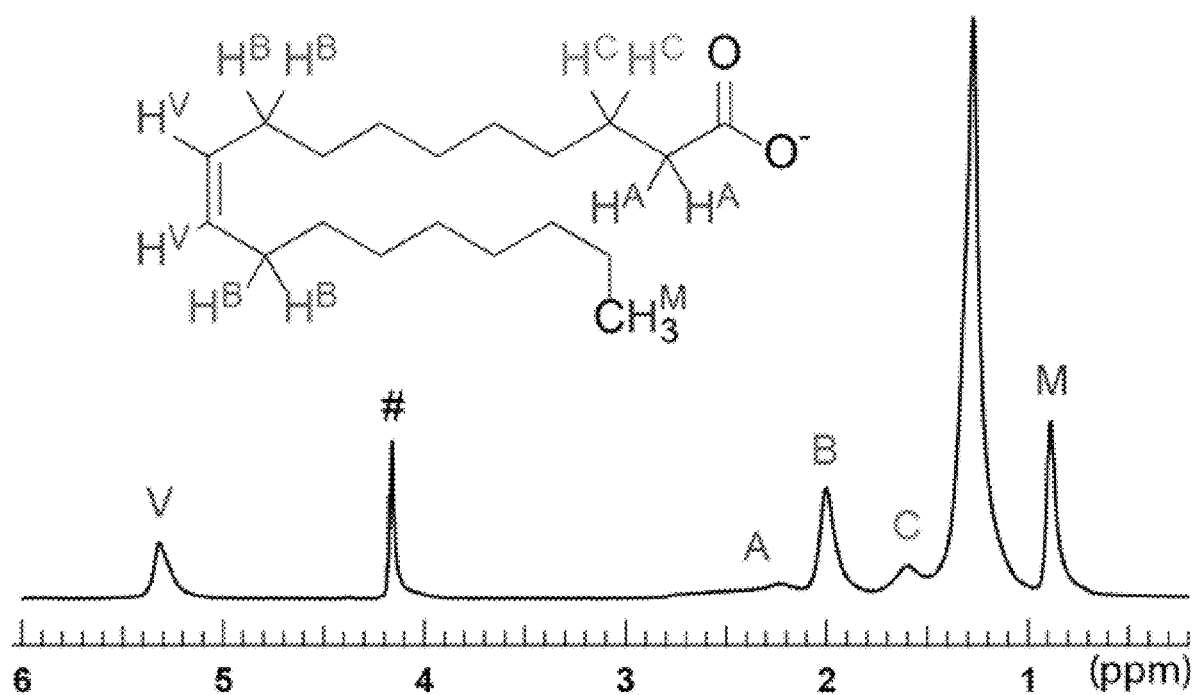
FIG. 4B illustrates $^1$H NMR spectra of as synthesized starting nanocrystals showing chemical shift assignments with labeled oleate surface ligands for reference, according to some embodiments of the present disclosure. The '#' symbol indicates the peak associated with ferrocene as the internal standard, which is used to measure the oleate concentration.

Cation incorporation mechanism: Without wishing to be bound by theory, it is proposed herein that $Ag^+$ incorporation upon cation exchange may be accomplished by a Z-type ligand exchange at the nanocrystal surface in which $AgNO_3$ displaces $Pb(oleate)_2$. The removal of $Pb(oleate)_2$ is first suggested by the observation that the treated nanocrystals tend to aggregate with increasing Ag+ incorporation levels. Thus, quantitative ¹H NMR spectroscopy was used to better measure how the surface ligand coverage on the nanocrystal changed with increased Ag+ doping. The broad vinyl proton peak (labeled 'V') of oleate surface ligand located between 5.0-5.5 ppm is well separated from the other peaks in the ¹H NMR spectrum (see FIG. 4B), which makes it a useful indicator for quantitative experiments. Ferrocene was used as an internal standard due to its high purity, ease of standardization in solution using absorbance spectroscopy, and sharp ¹H NMR peak near 4.2 ppm in $CDCl_3$ (labeled '#') that is well separated from oleate peaks.

By determining the concentration of oleate surface ligands from ¹H NMR and the concentration of nanocrystals from absorbance spectroscopy, the average number of ligands bound to single nanocrystals were calculated. An initial concern was that ethanol exposure from the dopant precursor solution, which is known to displace oleate surface ligands from the surface of metal chalcogenide nanocrystals, may have caused the observed aggregation. However, a control experiment showed that nanocrystals exposed to neat ethanol only resulted in the loss of ~4 ligands/nanocrystal, or 2% of the total oleate surface ligand coverage (see squares indicated with arrows FIG. 4A). Combined with elemental analysis for the various doped Ag:PbSe nanocrystals, the change of the ligand coverage with respect to dopant content was determined (see FIG. 4A open squares). Within the error of the experiment and assuming a spherical, stoichiometric nanocrystal model, it was determined that for every Ag+ incorporated, approximately 1 oleate surface ligand was displaced from the surface of the nanocrystal (see FIG. 4A solid squares). Without wishing to be bound by theory, using this 1:1 ratio as a simple mechanistic guide, two distinct schemes in which Ag+ may be incorporated into a PbSe nanocrystals were devised. See FIG. 19.

Figure 19:
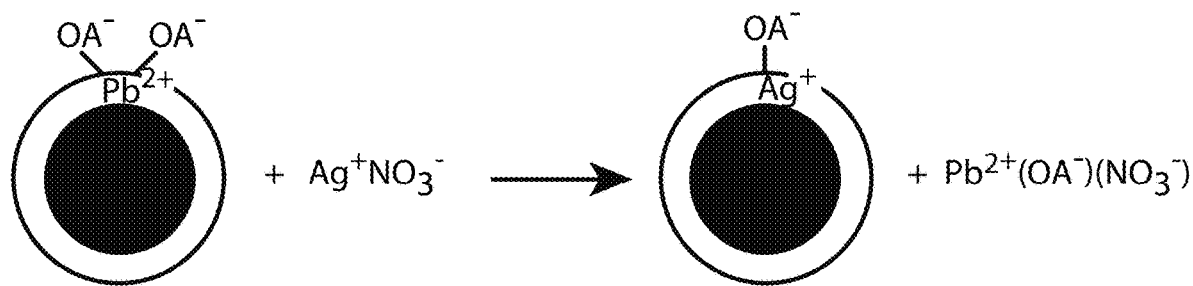
FIG. 19 illustrates two distinct schemes for proposed mechanisms for incorporating $Ag^+$ into PbSe nanocrystals, according to some embodiments of the present disclosure.
Figure 19:
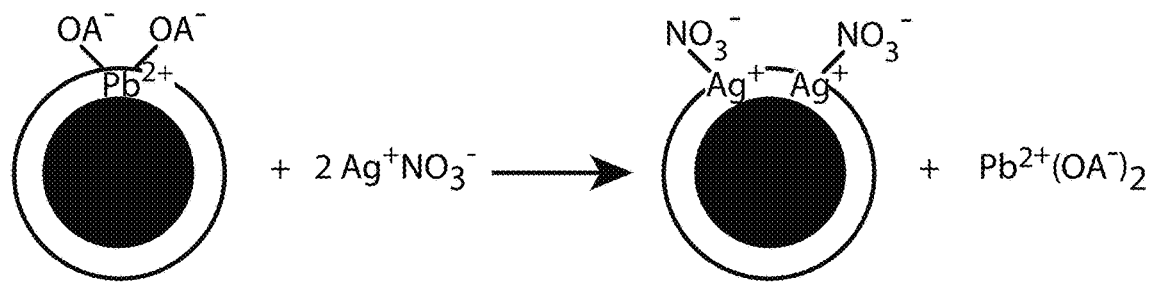

In Scheme 1 of FIG. 19, a 1:1 exchange of Ag+ for $Pb^{2+}$ occurs with a single oleate surface ligand providing charge balance for the nanocrystal. If Ag+ replaces $Pb^{2+}$ in the PbSe nanocrystal crystal lattice, one would expect Ag+ to behave as a substitutional p-type dopant. Scheme 2 of FIG. 19 depicts a 2:1 replacement of Ag+ for $Pb^{2+}$. Here, it is plausible that one of the Ag+ incorporates substitutionally by taking the place of the exchanged $Pb^{2+}$ in a similar manner as in Scheme 1. The other Ag+ may incorporate at a surface interstitial position. In order to maintain an incorporated Ag+: displaced oleates surface ligand ratio of 1:1, the nanocrystal in Scheme 2 may be charge balanced by two $NO_3^-$. Both schemes are consistent with the data in FIG. 4 and may be classified as Z-type ligand exchanges.

Figure 5A:
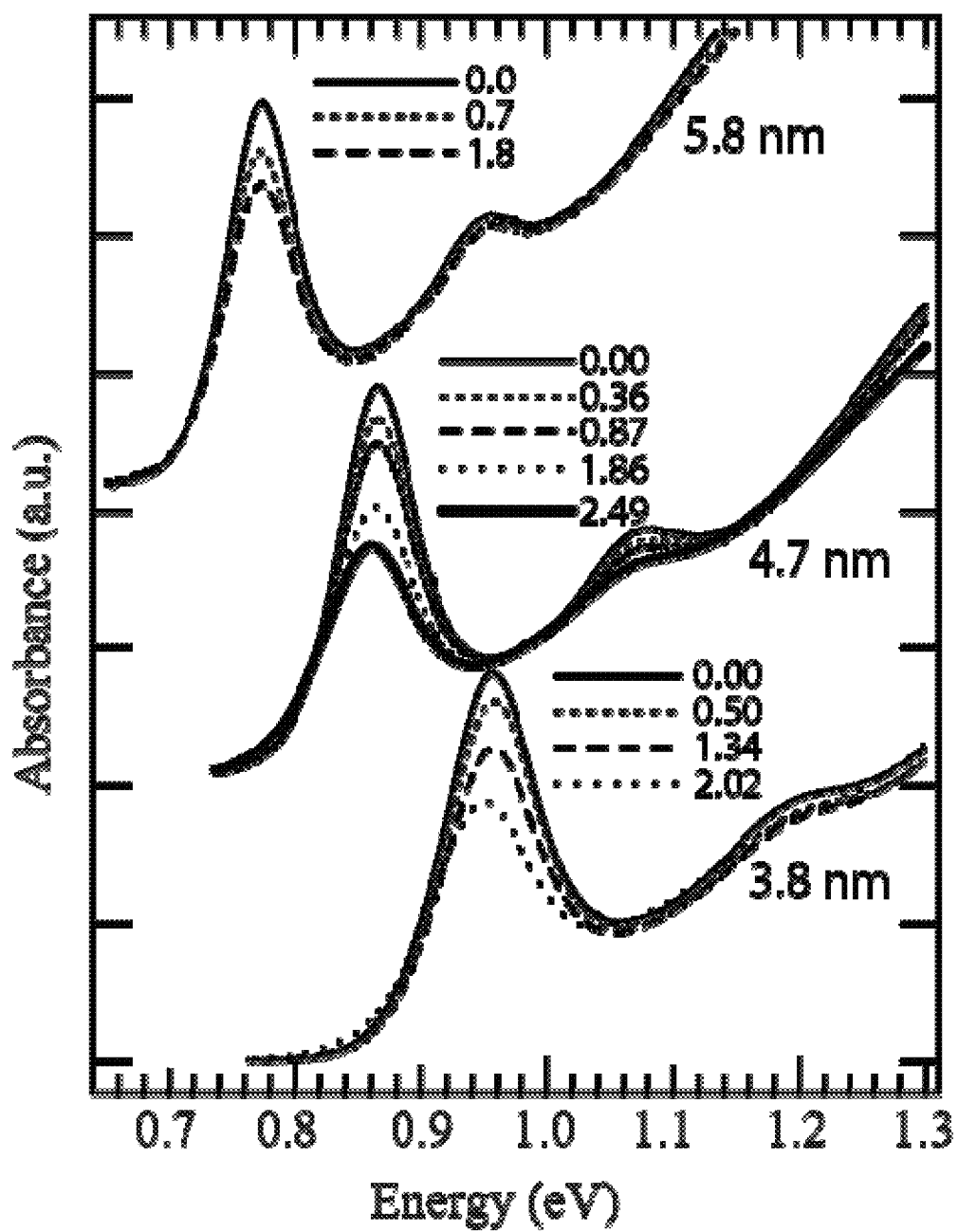
FIG. 5A illustrates absorbance spectra of 3.8 nm, 4.7 nm, and 5.8 nm PbSe nanocrystals dispersed in TCE, according to some embodiments of the present disclosure. The first and second excitonic features bleach with increasing dopant content due to band-edge state filling. The dopant percentage is determined from elemental analysis and the average number of delocalized carriers, $<N_d>$, is calculated as described in the text.
Figure 5B:
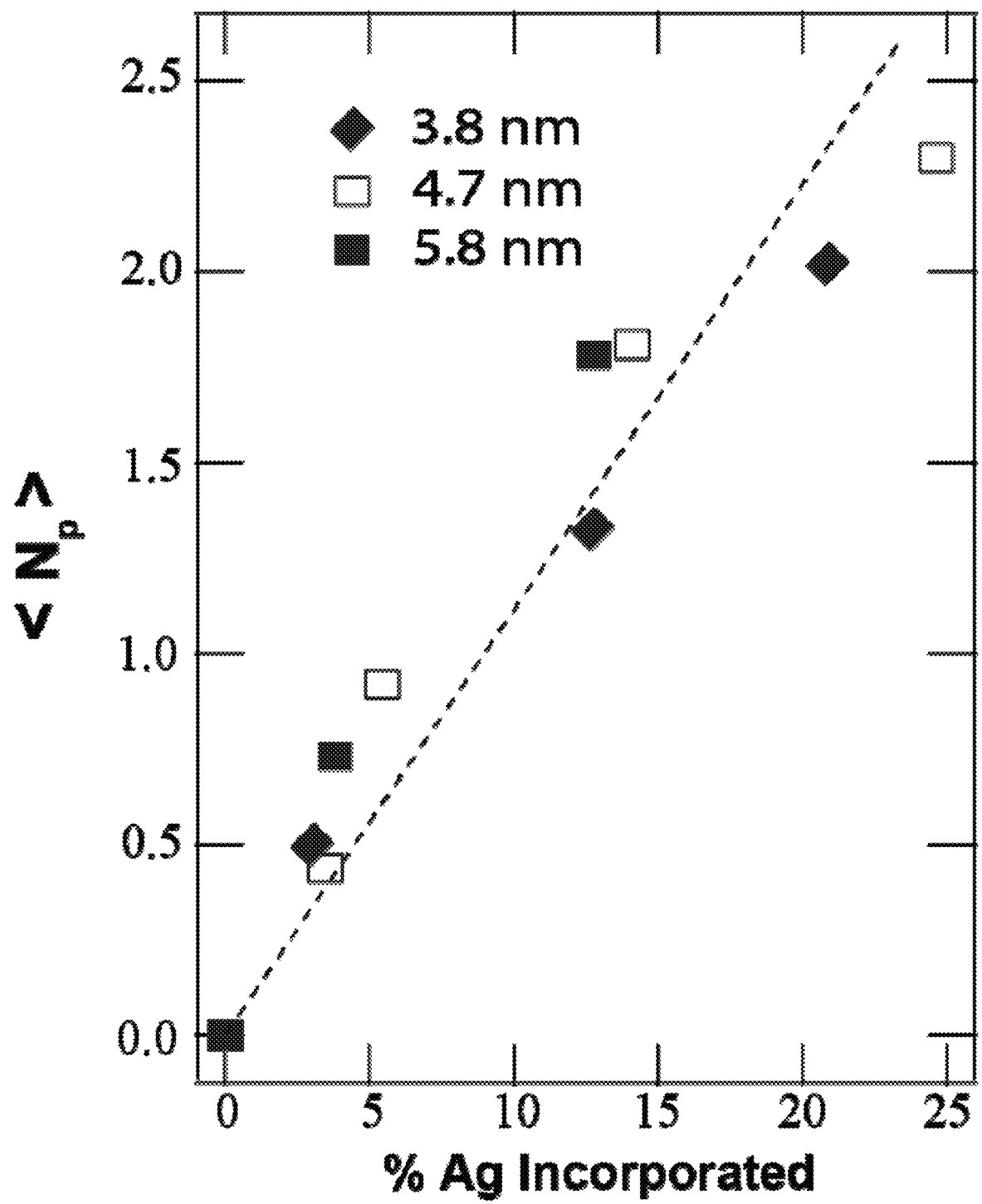
FIG. 5B illustrates $<N_d>$ as a function of % Ag$^+$ incorporated, showing a doping efficiency of 1 delocalized carrier per 10% Ag$^+$ incorporation for the 3.8 and 4.7 nm samples and slightly lower for the 5.8 nm sample (1-delocalized carrier per 15% Ag incorporation), according to some embodiments of the present disclosure.
Figure 6:
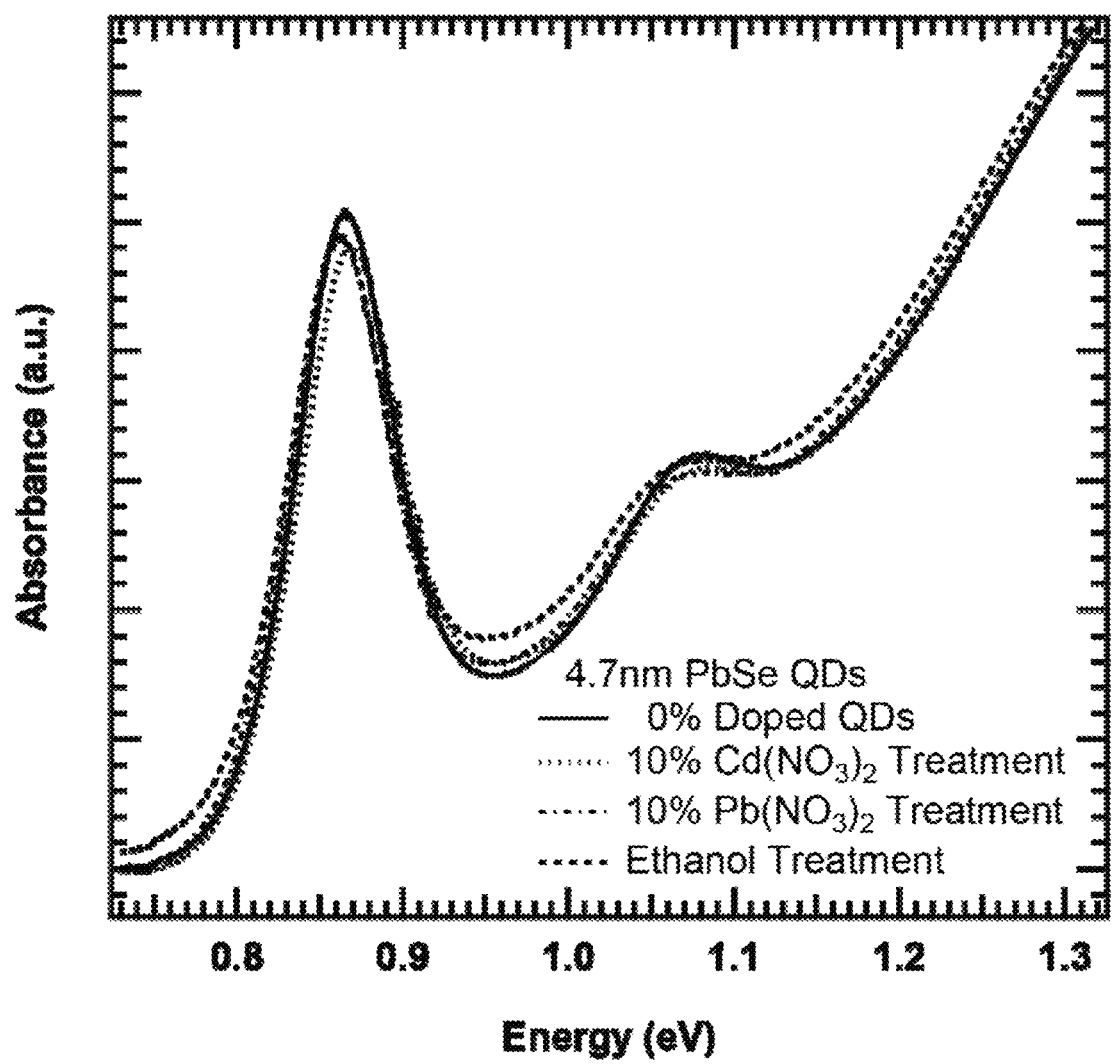
FIG. 6 illustrates results from control absorbance experiments, according to some embodiments of the present disclosure. The addition of Cd(NO$_3$)$_2$ (smaller dashes), Pb(NO$_3$)$_2$ (dot-dash), or neat ethanol (larger dashes) results in moderate bleaching and shifting of the PbSe nanocrystal first exciton peak.

Bleaching of exciton transitions: In order to determine the doping efficiency of Ag+ cations in doped PbSe nanocrystals, the change in absorbance of the first exciton transition was measured. As shown in FIG. 5A, the sharp first and second excitonic absorbance features bleached with increasing Ag+ content. Also, there was very little change in the first exciton transition energy peak with increased Ag+ incorporation, with a small red-shift for the highest doping level. Control experiments were performed where neat ethanol, $Cd(NO_3)_2$, or $Pb(NO_3)_2$ was added to a nanocrystal solution in order to confirm that the observed bleaching was due solely to Ag+ incorporation (see FIG. 6). The average occupancy of delocalized carriers was estimated from the bleach of the absorption spectra assuming a Poisson distribution and an 8-fold degenerate $1S_e/1S_h$ exciton level. The normalized bleach is $\Delta\alpha/\alpha = \Sigma_{m=1}^{8} m \cdot P_m/8 + \Sigma_{m=9}^{\infty} P_m$, where $P_m = \langle N_d \rangle^m \exp(-\langle N_d \rangle)/m!$ and $\langle N_d \rangle$ is the average number of delocalized dopants per nanocrystal. To determine $\Delta\alpha/\alpha$ integrated the absorbance of the undoped and doped samples was integrated and for the 4.7 nm sample determined that $\langle N_d \rangle = 0.36$, 0.87, 1.86 and 2.49 for the 3.62%, 5.61%, 14.05%, and 24.3% doped nanocrystals (see FIG. 5B). The slope of $\langle N_d \rangle$ vs % Ag incorporated (see FIG. 5B) is an estimate of the doping efficiency. It was determined that for all of the nanocrystals studied here, about 10% silver incorporation leads to about 1 electronically active dopant per nanocrystal.

Calculations by Zunger and co-workers demonstrate that the first exciton transition strength can be modified either by charges injected into interior states of the nanocrystals or trapped charges at the surface of the nanocrystals (see *Phys. Rev. B* 76, 161310 (2007)). Charges injected into the interior PbSe nanocrystal states cause a reduction by Pauli-blocking (state-filling) resulting in a ⅛ reduction in oscillator strength for every 1 charge injected (assumed above). Trapped charges modify the absorption through electric field effects and result in both a shift of the energy levels (Stark shift) as well as a reduction in the oscillator strength. Thus a bleach of the 1S exciton level alone is not sufficient to conclude that charges are injected into the interior states of the nanocrystal. Higher energy transitions were not found and signs of both a small reduction in oscillator strength as well as shifted transitions were evident, which may be attributed to local electric fields located at or near the nanocrystal surface. To confirm this, control experiments were performed using $Cd(NO_3)_2$ and $Pb(NO_3)_2$ rather than $AgNO_3$, which showed that the exciton transition was slightly bleached and shifted, (see FIG. 6) but the bleach was much less than observed for Ag+ incorporation.

Intraband absorption: A first exciton bleach, when induced by doping, may be accompanied by an absorption in the infrared corresponding to intraband transitions. The combination of these two observations (first exciton bleach/intraband transition) may be described as the spectroscopic signatures of excess band-like charge carriers upon nanocrystal doping. The intraband absorption may then arise from the excitation of these additional carriers from the $1S_e$ to $1P_e$ state for the case of an n-type dopant, or from the $1S_h$ to the $1P_h$ for a p-type dopant (inset of FIG. 7A).

Figure 7A:
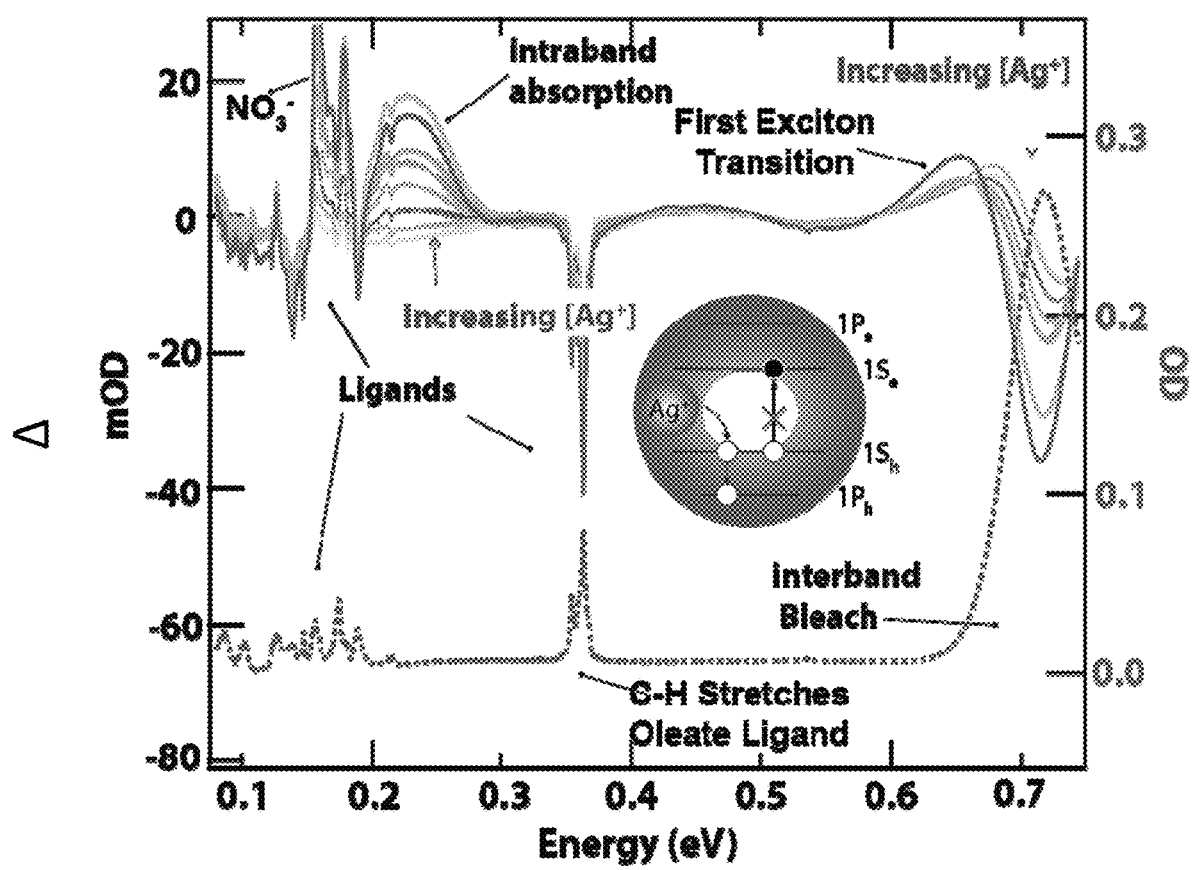
FIG. 7A illustrates FT-IR absorbance spectra of 6.0 nm EDT ligand exchanged PbSe nanocrystals), according to some embodiments of the present disclosure. The inset represents the optical transitions expected for dope Ag:PbSe nanocrystals. These optical signatures are observed in the differential FT-IR absorbance spectra and grow in/bleach as the PbSe nanocrystal film is exposed to increasing amounts of AgNO$_3$ in ethanol. The right axis corresponds to the red spectrum showing a typical FT-IR absorbance spectrum of partially EDT-exchanged PbSe nanocrystals. The left axis corresponds to the solid traces where negative values represent a bleach of the red spectrum and positive values represent a new absorbance peak.

Accompanying the first exciton bleach, an IR absorption band was observed in Ag:PbSe nanocrystals with diameters between about 3.0 nm and about 7.0 nm. The dashed trace in FIG. 7A shows the FT-IR absorbance spectrum of a thin film of 1,2-ethanedithiol (EDT) exchanged 6.0 nm PbSe nanocrystals. This size of nanocrystals was chosen so that both the exciton transition and the intraband transition could be monitored simultaneously within the FT-IR spectral window. The solid traces show the change in FT-IR absorbance ($\Delta$OD) spectrum changed after exposure of the PbSe nanocrystal films to the solution of $AgNO_3$ in ethanol. For these measurements, the undoped film was used as the reference scan. Scans were then taken after exposure to the $AgNO_3$ solutions for increasing amounts of time. The raw collected data is a difference scan. It was determined that increasing Ag+ exposure, and thus nanocrystal incorporation, resulted in the appearance of a sharp infrared absorbance near 0.22 eV and a bleach of the first exciton transition near 0.72 eV. The sharp peaks below 0.2 eV are due to residual $NO_3^-$ ions. The signal increased with increasing exposure to Ag+ dopant solution, further emphasizing the likelihood of a Z-type ligand exchange mechanism, as discussed above.

Figure 7B:
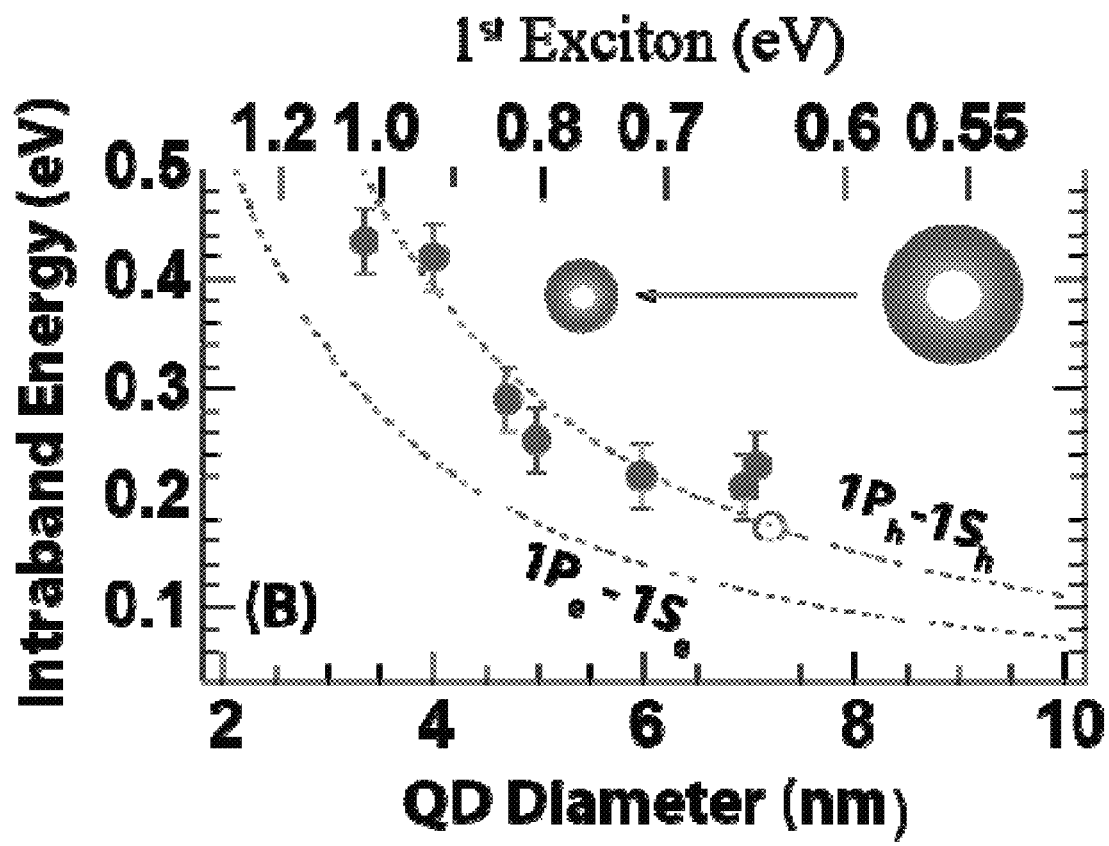
FIG. 7B illustrates the Ag:PbSe nanocrystal intraband transition as a function of nanocrystal size (solid circles) compared to calculated intraband energies from k·p theory (dashed line), according to some embodiments of the present disclosure. Error bars represent the HWHM [define] of the IR absorption band.
Figure 7C:
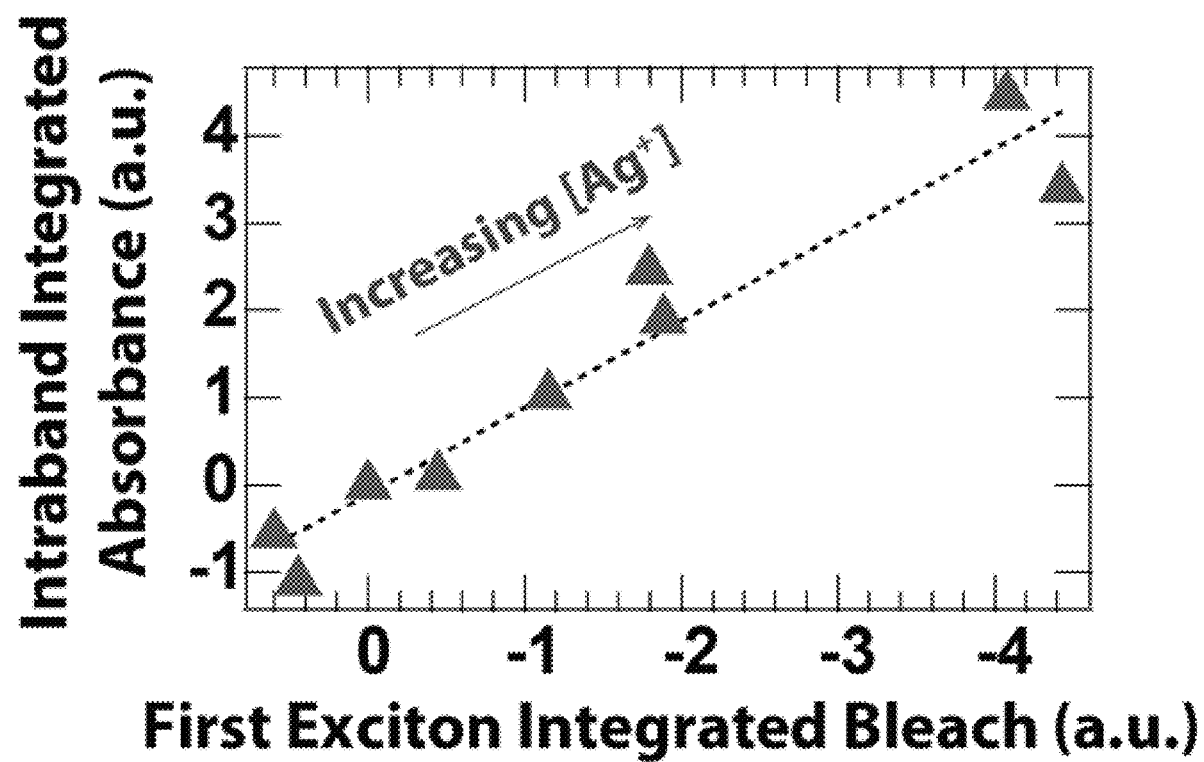
FIG. 7C illustrates a comparison of the integrated intraband absorption and first exciton bleach show a near 1:1 linear dependence), according to some embodiments of the present disclosure.

Without wishing to be bound by theory, the appearance of the IR absorption band may be attributed to (1) a localized surface plasmon resonance (LSPR) observed in heavily doped nanocrystals; (2) the formation of small $Ag_2Se$ nanocrystals ($Ag_2Se$ is a small bandgap semiconductor); and/or (3) an intraband absorbance induced by excess band-like charge carriers. The LSPR option may likely be ruled out because as the $Ag^+$ concentration increased the center frequency and shape of the band did not change, only its intensity. In addition, the formation of $Ag_2Se$ nanocrystals may be ruled out because no evidence was found in the XRD data of FIG. 3C that would suggest the presence of $Ag_2Se$ domains. Finally, as shown in FIG. 7B the measured IR absorption band exhibited a nanocrystal size dependence consistent with k·p theory calculations for the $1S_h-1P_h$ transition. An IR absorption band was observed for all sizes of PbSe QDs studied. To further rule out a reduction of the oscillator strength due to surface charging, it was determined that the first exciton transition bleached in a 1:1 fashion with the increase in intraband transition intensity (see FIG. 7C). Thus, the IR absorption band may be assigned as an intraband transition in the Ag:PbSe nanocrystals and the bleach may arise from state-filling rather than charging. A diagram illustrating both the intraband absorbance and the first exciton bleach is shown in the inset of FIG. 7A.

Photoelectron spectroscopy: X-ray photoelectron spectroscopy (XPS) and ultraviolet photoelectron spectroscopy (UPS) was performed on doped Ag:PbSe nanocrystalss in order to determine how addition of $Ag^+$ shifts the Fermi-level. For accurate XPS/UPS measurements of nanocrystals, films must be conductive so that photocharging does not complicate data analysis. Conductive films of doped Ag:PbSe nanocrystals that were treated with EDT were fabricated. Additionally, it is of interest to understand how the nanocrystal chemical environment may affect results. As-synthesized, starting PbSe nanocrystals may have an excess of Pb at the surface and may tend to be n-type. Subsequent treatment of nanocrystal films with EDT may introduces surface chalcogen causing the nanocrystal Fermi level to shift towards the valence band edge. Furthermore, the exposure of nanocrystals to ambient conditions may result in oxidation and effectively dope nanocrystal films p-type. In this work, the films are kept strictly air-free so any observed changes in carrier type is strictly a result of the added $Ag^+$ cations.

Figure 8A:
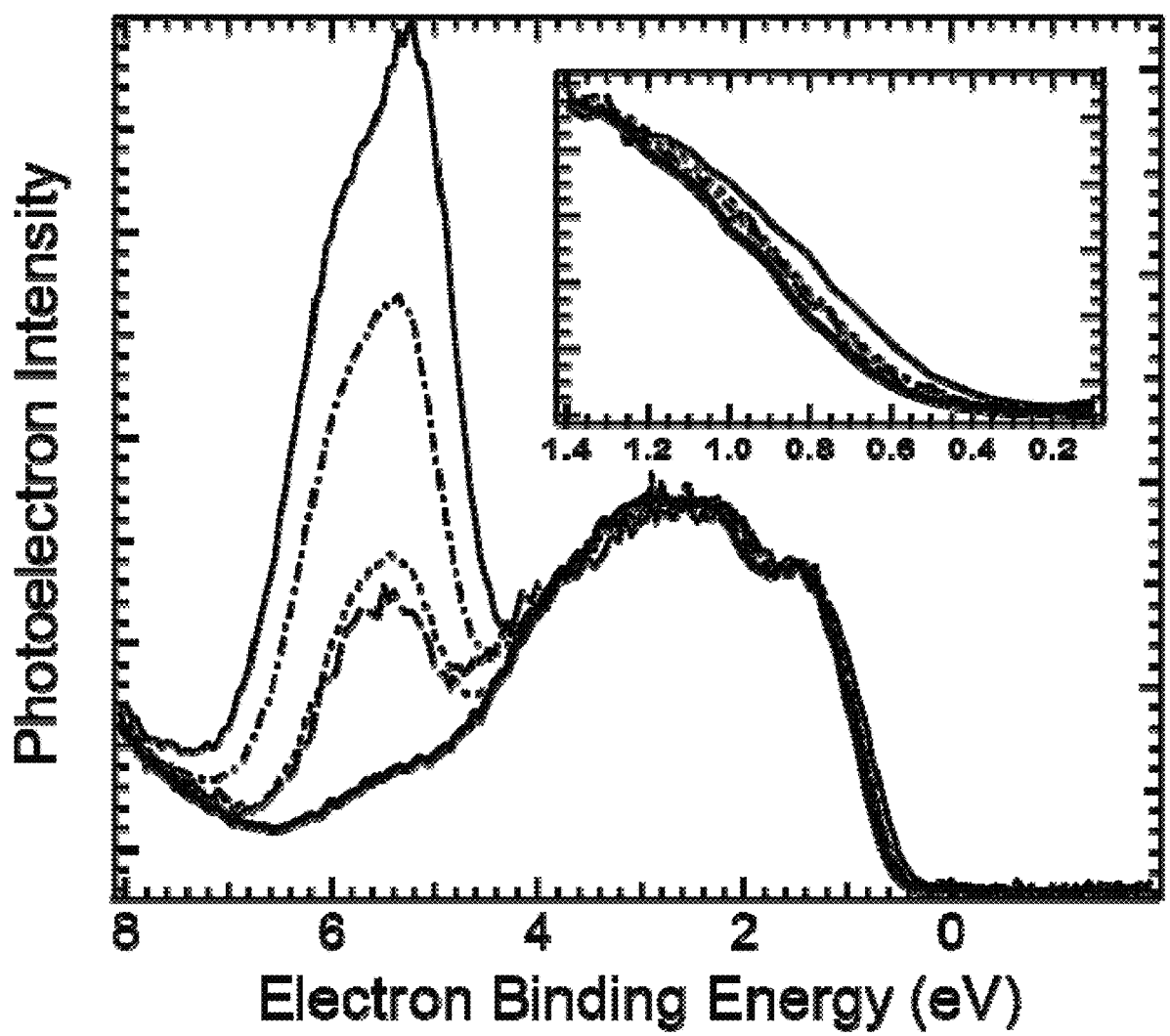
FIG. 8A illustrates XPS spectra for as synthesized (solid trace), 3.6% Ag$^+$ doped (longer dash), 5.6% Ag$^+$ doped (smaller dash), 14.1% Ag$^+$ doped (dash-dot), and 24.3% Ag$^+$ doped (thicker solid trace) 4.7 nm diameter PbSe nanocrystals, according to some embodiments of the present disclosure. There was a noticeable increase in the photoelectron intensity around 5.5 eV with increasing Ag$^+$ content, which is attributed to the formation of Ag—Se bonds. Inset gives a detailed view of the VB onset region showing a shift to lower energies with increased Ag$^+$ content.
Figure 8B:
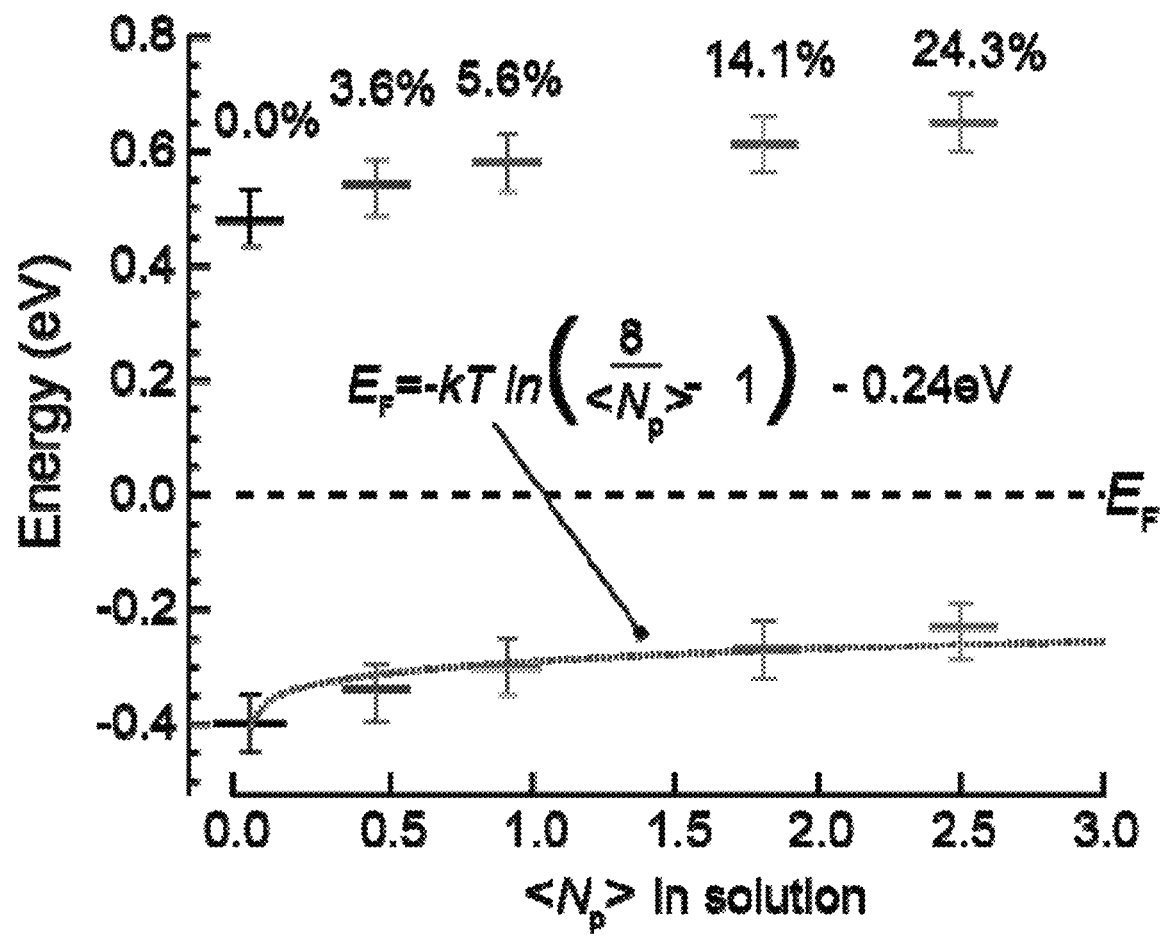
FIG. 8B illustrates UPS band positions of PbSe nanocrystals with respect to the Fermi level (set to zero), according to some embodiments of the present disclosure. Increasing the Ag$^+$ content in PbSe nanocrystals resulted in more p-type character.
Figure 9:
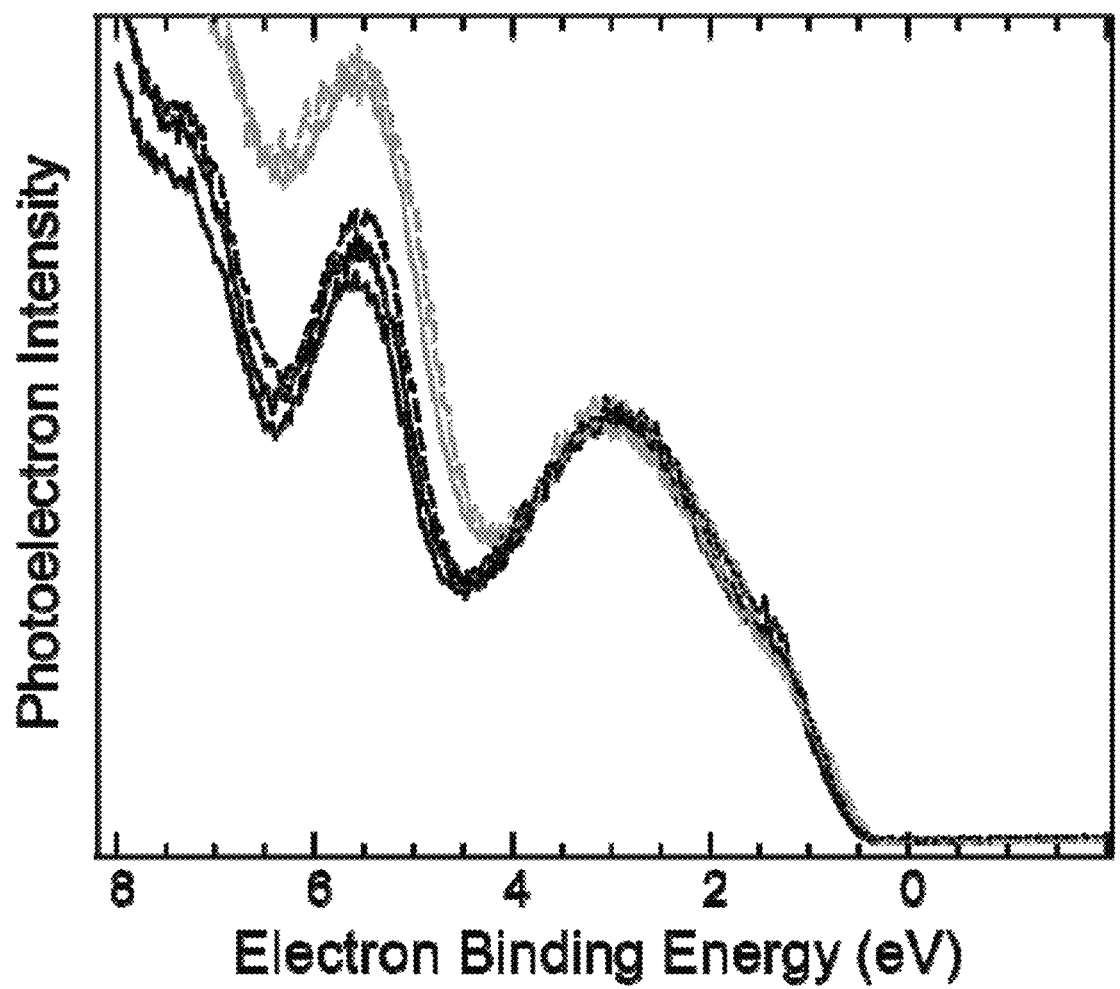
FIG. 9 illustrates UPS spectra for as synthesized (solid trace), 3.6% Ag+ doped (dark smaller dashes), 5.6% Ag+ doped (dark longer dashes), 14.1% Ag+ doped (lighter dashes), and 24.3% Ag+ doped (lighter solid line) PbSe nanocrystals), according to some embodiments of the present disclosure. There is a noticeable increase in the photoelectron intensity around 5.5 eV with increasing Ag+ content, which is attributed to the formation of Ag—Se bonds.

The XPS and UPS data of EDT exchanged films of the as synthesized, 3.6%, 5.6%, 14.1%, and 24.3% doped 4.7 nm diameter PbSe nanocrystals are summarized in FIGS. 8A, 8B, and 9. There are two clear trends in the data. First, both the XPS (see FIG. 8A) and UPS (see FIG. 9) VBM for Ag:PbSe nanocrystal films shifted to lower electron binding energies as the $Ag^+$ content increased, which indicates increasing p-type character with increased $Ag^+$ incorporation—consistent with $Ag^+$ acting as an electron acceptor (p-type dopant). Second, there was a significant increase in the XPS photoelectron intensity around 5.5 eV with increasing $Ag^+$ content, which may be assigned to the formation of Ag—Se bonds.[30] This trend is also observed in the UPS spectra (see FIG. 9). The absence of photoelectron intensity at and below zero electron binding energy and the prevalent Ag—Se transitions suggests that there was no elemental $Ag^0$ present, but rather that $Ag^+$ was incorporated into the PbSe nanocrystals.

Figure 10:
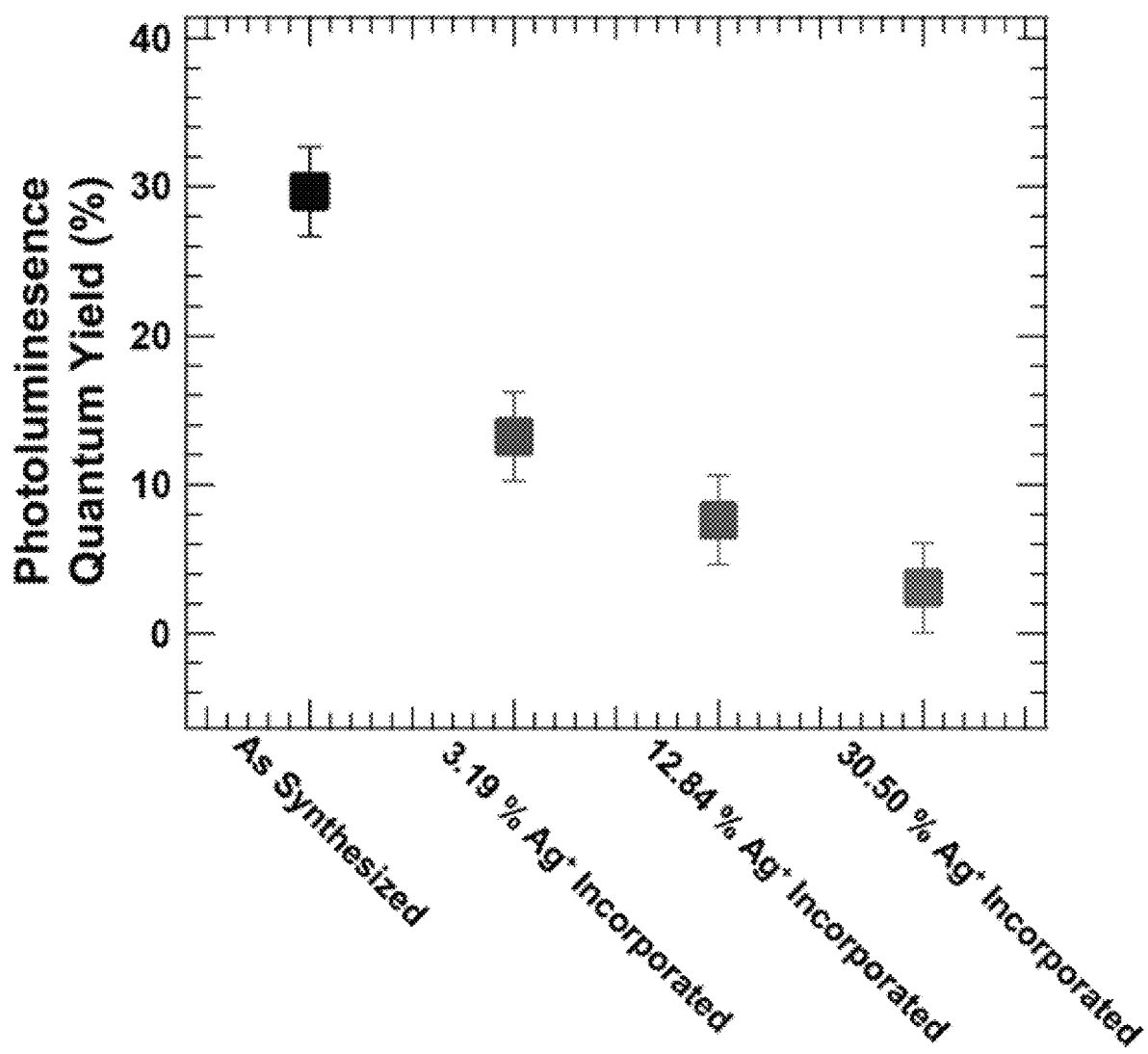
FIG. 10 illustrates PL QY as a function of Ag$^+$ dopant content for 3.8 nm PbSe nanocrystals), according to some embodiments of the present disclosure. The PL QY drastically decreased with increasing dopant levels, suggesting the addition of non-radiative recombination centers with increasing Ag$^+$ content.

Photoluminescence and Time-resolved Absorption Spectroscopy: The photoluminescence quantum yield (PL QY) was measured for 3.8 nm as for starting nanocrystals (also referred to as "as synthesized") and doped Ag:PbSe nanocrystals (see FIG. 10). The introduction of additional $Ag^+$ impurities led to quenching of the absolute PL QY of doped Ag:PbSe nanocrystals suggesting the introduction of new nonradiative relaxation pathways. If it is assumed that a doped nanocrystal does not emit, then the decrease in the photoluminescence quantum yield (PLQY) corresponds to the number of delocalized dopants. For example, 3.2% $Ag^+$ incorporation corresponds to a doping level of $<N_d>=0.36$ and therefore ~60% of the nanocrystals are not doped leading to ~40% reduction in the PLQY; here a reduction of ~45% is observed. Similar reductions were observed in the PL QY for the other nanocrystals with increasing $Ag^+$ content, consistent with the $<N_d>$ values determined from absorption bleaching. It is important to point out that the % $Ag^+$ incorporation was averaged over all nanocrystals. Therefore, even though ~40% of the nanocrystals registered as doped, all of the nanocrystals contained incorporated $Ag^+$. However, those nanocrystals that were not electronically doped behaved similarly to nanocrystals with no $Ag^+$ incorporation. Thus, $Ag^+$ incorporation, by itself, did not modify the PL characteristics of the nanocrystals.

Figure 11:
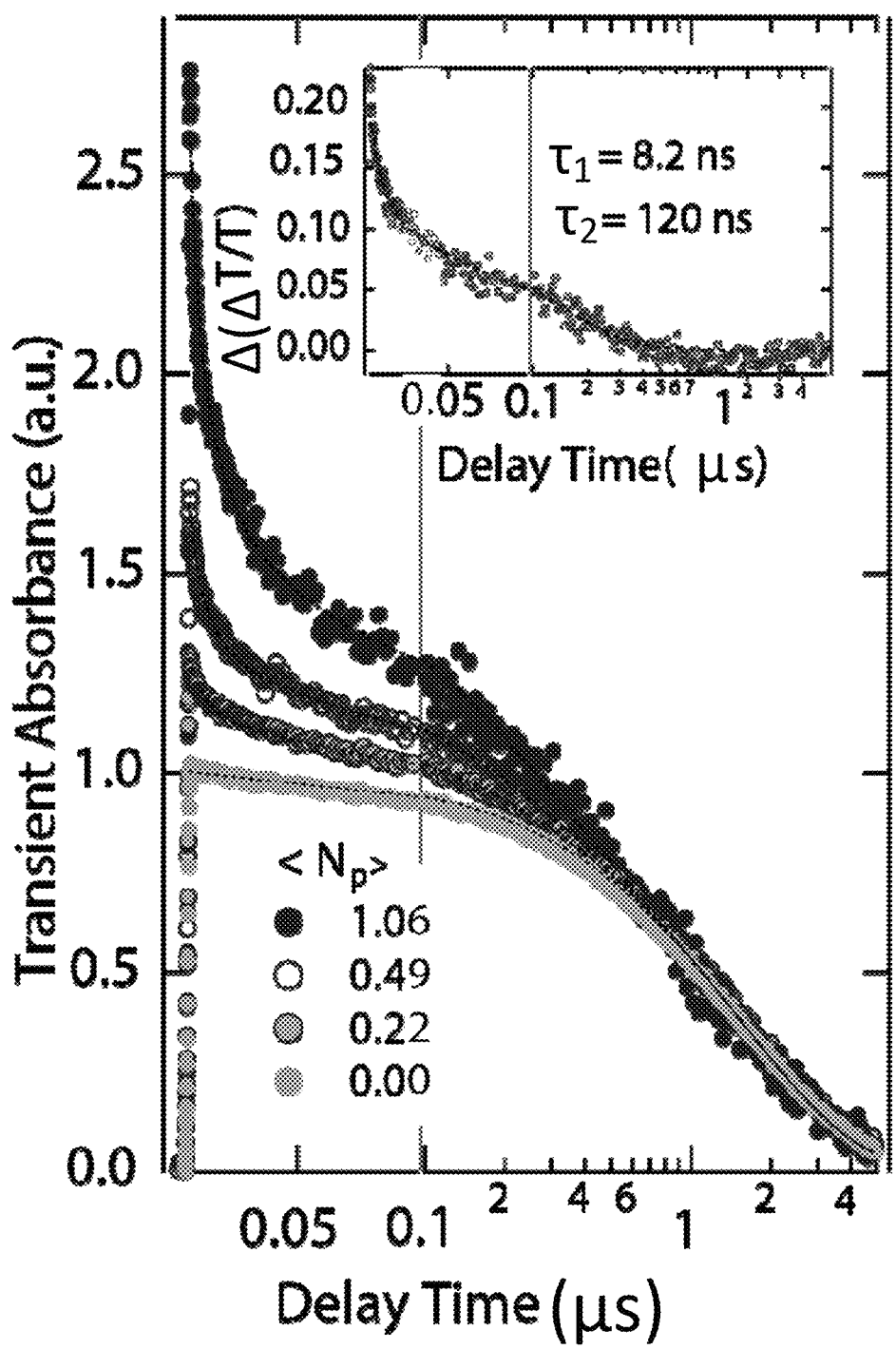
FIG. 11 illustrates decay dynamics of starting nanocrystals and doped Ag:PbSe 3.8 nm nanocrystals normalized at long decay times (greater than 400 ns). The undoped, starting nanocrystals have a single exponential lifetime of 1.55 microseconds. The dashed traces are the results of the global model discussed in the text. The inset shows the response from just the electronically doped nanocrystals and the response is biexponential with time constants of 120 ns and 8.2 ns.

TA spectroscopy was used to capture both early (ps) and long (µs) exciton decay kinetics of 3.8 nm as starting nanocrystals and doped Ag:PbSe nanocrystals. FIG. 11 shows normalized TA kinetics for the various doped Ag:PbSe nanocrystals under identical laser excitation fluence. The laser pump wavelength was set to 700 nm, well below the MEG limit for these nanocrystal samples. The pump photon fluence was adjusted to achieve 0.016 absorbed photons per pulse per nanocrystal, so no biexcitons were photoexcited during the experiment and the observed decay originated from single excitons. As the $Ag^+$ dopant content increased, a faster decay of the exciton population was observed over the course of 4.5 µs, but at delays greater than ~400 ns the decays were identical.

To simulate the data, it was assumed that the decreased exciton lifetime was due to the presence of electronic dopants. The data were first normalized so that the contribution to the decay from undoped nanocrystals was equal to 1. For example, for the third data set (solid outer line with gray fill) from the top in FIG. 11, the average number of dopants was determined from the bleach of the absorption to be $<N_d>=0.22$. Therefore, the fraction of the signal that arose from undoped nanocrystals was $P_0=0.80$, and the data was then normalized so that its maximum was 1.25. FIG. 11 shows the normalized data for $<N_d>=0$, 0.22, 0.49 and 1.06. By normalizing in this fashion the data at later times become coincident since the response from undoped nanocrystals was normalized to one. This implies that nanocrystals that were electronically doped decayed faster, while the longer delay time represents the exciton decay dynamics for only those nanocrystals that were undoped. To model all of the transients from the differently doped samples the kinetics of the undoped sample were determined (FIG. 11, the gray trace w/o an outer line) and it can be represented by an exponential function with time constant of 1.55 µs. To determine the response from the doped nanocrystals, the difference between kinetics recorded for the nanocrystals with $<N_d>=0.22$ and the undoped nanocrystals was determined, leaving only the kinetics for the doped nanocrystals (see inset of FIG. 11). The dynamics of the doped samples cannot be represented by a single exponential function, but a double exponential decay may be used with best-fit time constants of 8.2 and 120 ns. All of the transients for the differently doped samples may now be modeled simultaneously using the following function, $\Delta\alpha(t)/\alpha = E_{m=0}^{\infty} <N_d>^m / m! \cdot \varphi_m(t)$, where $\varphi_m(t)$ is the response of nanocrystals with m electronic dopants. Terms up to m=5 were tested but it was determined that m=3 is sufficient to completely reproduce the data set. In the global fit, $\varphi_0$ is a single exponential with a fixed time constant of 1.55 µs, $\varphi_1$ is a double exponential with time constants fixed at 8.2 and 120 ns determined above, $\varphi_3$ is a double exponential that is allowed to float and a best-fit time corresponds to constants of 2.7 ns and 50 ns. The best fits are shown by the dashed lines in FIG. 11.

The data described above clearly demonstrates that p-type electronic impurity doping of PbSe nanocrystals through the incorporation of $Ag^+$ was achieved, which gives rise to the spectroscopic signatures of nanocrystal doping. However, two drastically different doping characteristics was observed in PbSe nanocrystals compared to bulk PbSe. First, the incorporated $Ag^+$ concentrations in PbSe nanocrystals (up to 30%) are much higher than the bulk solubility limit of Ag in bulk PbSe (between 0.5 and 1%). From the XRD and TEM analysis (FIGS. 3A and 3B) one can conclude that $Ag_2Se$ does not form as a separate component of the nanocrystals. In some instances, when $Pb^{2+}$ is added to a CdSe nanocrystal, distinct PbSe components form with a well-defined XRD pattern, which can be readily observed in TEM pictographs, however, this phenomenon was not seen here. Alternatively, an alloy would result in changes to the resulting crystal lattice constants, which was also not observed in the XRD data described herein. A bulk alloy of PbSe and $Ag_2Se$ does not form at low temperatures. Rather, they typically phase segregate for $Ag^+$ concentrations greater than ~1%. Second, the measured doping efficiency for $Ag^+$ doped PbSe nanocrystals was much lower than Ag for bulk PbSe. Specifically, Ag doping of bulk PbSe is much more efficient, needing only 0.1% Ag incorporation to achieve hole carrier densities of $\sim 1 \times 10^{19}$ cm$^{-3}$. In comparison, one delocalized carrier in a 4 nm diameter PbSe nanocrystal (~1000 total atoms with ~600 $Pb^{2+}$ cations)$^{22}$ corresponds to a doping density of roughly $3 \times 10^{19}$ cm$^{-3}$ ($1/V_{NC}$). From elemental analysis, one can achieve close to 30% $Ag^+$ incorporation into PbSe nanocrystals, which would give a doping density close to $5 \times 10^{21}$ cm$^{-3}$ ($180V/V_{NC}$) assuming that all of the incorporated dopants are electronically active. This value would result in degenerately doped nanocrystals, which is contradictory to what was observed herein from PES measurements.

Without wishing to be bound by theory, the following model is proposed to physically explain the data described herein. Most of the $Ag^+$ incorporation may occur within the metal/carboxylate ligand shell that protects the internal core of the nanocrystals. For 3.8 nm PbSe nanocrystals there may be an excess of $Pb^{2+}$ at the surface of the nanocrystals that amounts to ~30-40% of all Pb atoms. Thus, $Ag^+$ replacement of the excess $Pb^{2+}$ may result in up to a 40% $Ag^+$ incorporation with no apparent change in structural properties. Such a scenario is consistent with Z-type ligand exchange. Neither ligand exchange expressed in Scheme 1 and 2 (see FIG. 19) is likely to provide electronic doping, because the $Ag^+$ remains at the surface of the nanocrystals. Rather, the $Ag^+$ may diffuse into the lattice and substitutionally replace $Pb^{2+}$ in the internal core of the nanocrystal for electronic doping to be realized. One might expect that if the $Ag^+$ forms a single layer at the surface, then the 1S exciton energy level may shift to higher energies because the PbSe nanocrystal internal core may effectively shrink upon surface $Pb^{2+}$ displacement; however, this is not the case. Even when the concentration of $Ag^+$ incorporated was quite high (24%) only a small red-shift was observed. Therefore, the $Pb(oleate)_2$ ligand layer does not appear to contribute significantly to the core electronic states of PbSe. This observation is consistent with the excess $Pb^{2+}$ in as-synthesized PbSe nanocrystals exhibiting only slight n-type character despite the large amount of excess $Pb^{2+}$ because the excess $Pb^{2+}$ is mainly found at the nanocrystal surface.

The diffusivity of Ag in bulk PbSe is $\sim 6 \times 10^{-10}$ cm$^2$/s in bulk PbSe at room temperature. Therefore, Ag can apparently diffuse 4 nm (diameter of typical nanocrystal) in about 200 µs. As described herein, $Ag^+$ is more likely to diffuse out of the lattice and remain at the nanocrystal surface due to the large degree of structural defects. Thus, to maintain an equilibrium $Ag^+$ lattice concentration, a reservoir of $Ag^+$ resides at the surface of the nanocrystals that establishes an equilibrium concentration of dissolved $Ag^+$ within the PbSe lattice of the internal core of the nanocrystal. The surface $Ag^+$ layer also electronically passivates surface $Se^{2-}$ anions. Smaller amounts of $Ag^+$ may reside predominately at the nanocrystal surface and not result in the level of electronic doping that could be observed in the optical studies described herein. The diffusion of $Ag^+$ within the PbSe lattice mainly occurs through interstitial sites and may need to find a $Pb^{2+}$ vacancy in order to substitute. In bulk PbSe, the addition of $Ag^+$ increases the diffusion of $Pb^{2+}$ within the PbSe lattice, thus lowering the activation energy of diffusion and substitution.

If $Ag^+$ ions were to substitutionally replace $Pb^{2+}$ atoms in the PbSe lattice, $Ag^+$ may dope the nanocrystal p-type considering Ag has one less valence electron than Pb. This is consistent with theoretical calculations of Ag doped bulk PbSe where $Ag^+$ substitutes for $Pb^{2+}$ on the PbSe lattice producing an acceptor level and lowering of the Fermi level. In bulk PbSe, Ag substitutes for Pb and behaves as a p-type dopant, while for concentrations greater than 1%, Ag incorporates interstitially and behaves as an n-type dopant. As described herein, one is unable to drive the incorporated $Ag^+$ concentration higher in order to achieve interstitial doping, apparently due to increased displacement of carboxylate ligands that allow the nanocrystals to remain colloidally stable.

Introduction of an electronic dopant should decrease the exciton lifetime due to an increase in the number of recombination pathways. In addition, non-radiative Auger recombination pathways become possible and may drastically reduce the carrier lifetimes to be less than 1 ns. For the singly doped nanocrystals, a biexponential decay with lifetimes of 8.2 and 120 ns were measured. The 120 ns is closer to modification of the radiative lifetime $\tau_{r,N_d} = \tau_r/(N_d+1)$ or 775 ns. For nanocrystals with two dopants, the lifetimes decreased by about half from 8.2 and 120 to 2.5 and 50 ns. One possible explanation for the much longer lifetimes observed could be that the surface $Ag^+$ softens the potential at the surface. Such softened potentials have been shown to reduce Auger recombination.

Thus, the work described herein demonstrates an effective method of incorporating $Ag^+$ cations into PbSe nanocrystals using a post synthetic cation exchange technique that does not significantly perturb the original PbSe nanocrystal crystalline matrix. $Ag^+$ incorporation may be accompanied by a Z-type ligand exchange at the nanocrystal surface where $Pb(oleate)_2$ may be displaced in a 1:1 manner by $AgNO_3$. Additionally, a bleaching of the first exciton absorbance feature may be accompanied by the growth of a quantum confined infrared intraband absorbance. A quenching of band edge PL and the acceleration of a fast exciton decay channel with increasing $Ag^+$ incorporation may occur, suggesting the introduction of new nonradiative relaxation pathways with increased doping. Using photoelectron spectroscopy, $Ag^+$ was shown to behave as a p-type dopant for PbSe nanocrystals. Thus, a model is proposed herein where a majority of the added $Ag^+$ remains at the nanocrystal surface and does not interact with the PbSe nanocrystal core states. Small amounts of $Ag^+$ may diffuse into the crystal lattice and establish equilibrium between surface-bound and lattice-incorporated $Ag^+$. The methods described herein that enable the controllable synthesis of p-type semiconductor nanocrystals under equilibrium conditions may benefit numerous technological applications such as solar cells, photoelectrochemical cells, LEDs, and/or thermoelectrics.

Figure 12:
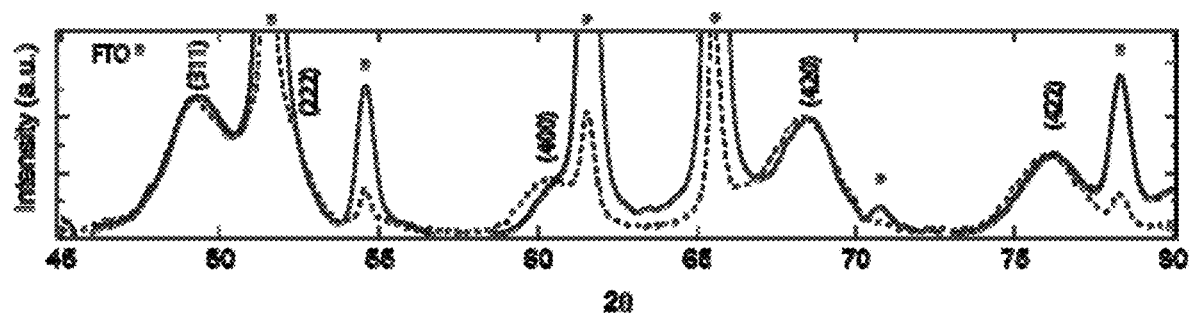
FIG. 12 illustrates high resolution XRD scan of the undoped (dashed trace) and ~30% doped (solid trace) PbSe nanocrystals deposited onto FTO/glass substrates, according to some embodiments of the present disclosure.

Further, direct evidence for $Ag^+$ substitutional incorporation into the PbSe nanocrystal core at a lower percentage than the total incorporated $Ag^+$ as measured from elemental analysis can be found in high-resolution XRD data. FIG. 12 shows the XRD peaks for the (220), (311), (222), (400), (420), and (422) reflections. Each of the peaks associated with the Ag:PbSe nanocrystals shift by at least 0.05 degrees compared to the undoped PbSe nanocrystal sample. The FTO peaks (denoted by *) serve as a reference to calibrate the two spectra. Gaussian peak fitting function is employed to decouple the FTO peaks from the PbSe peaks; PbSe peak locations are found using a custom fit function described in the Methods Section. The best fit peak positions are tabulated below. The deconvolved peaks are shown as the dashed lines with markers.

Figure 13:
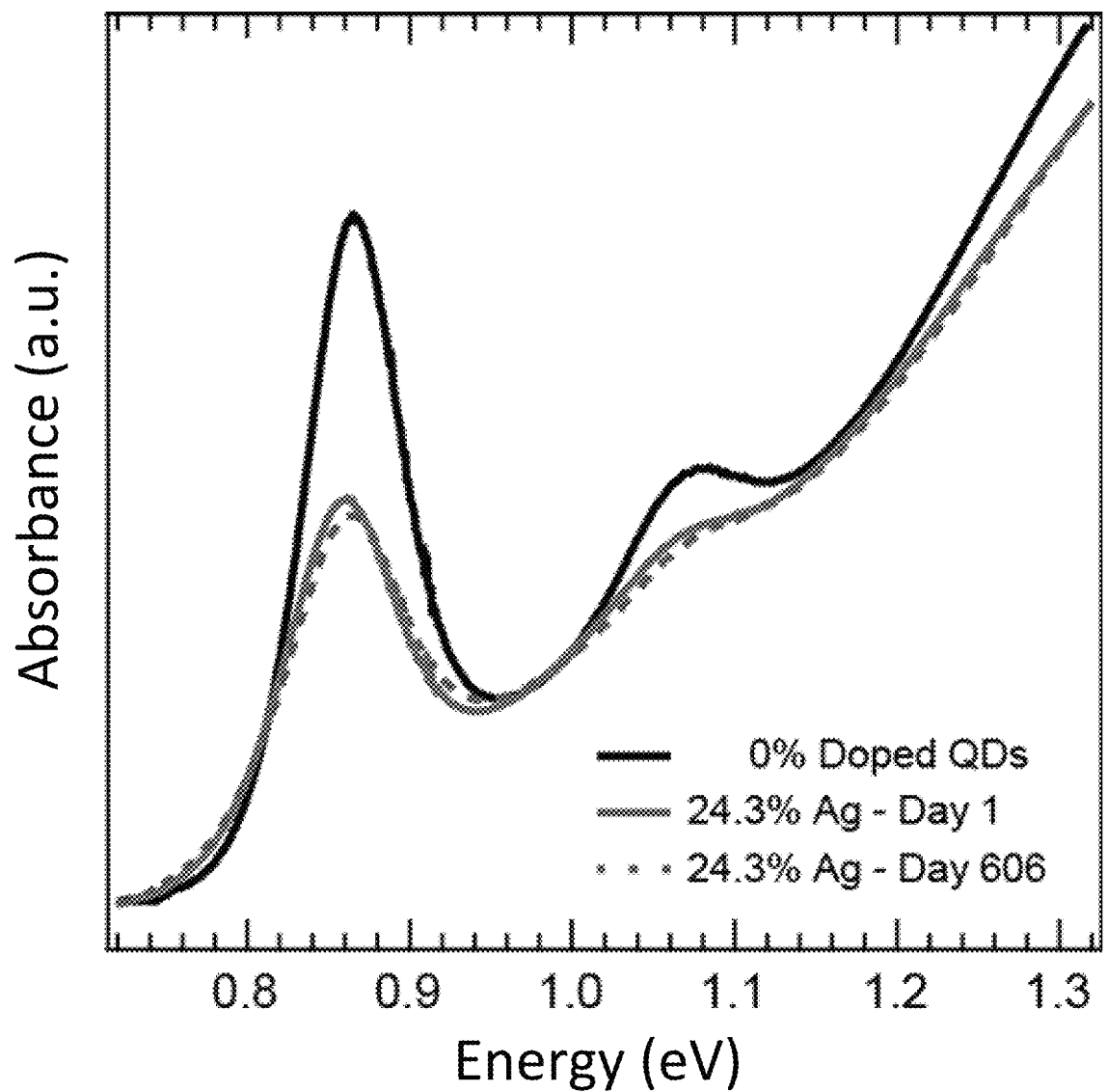
FIG. 13 illustrates control absorbance experiments of 4.7 nm PbSe nanocrystals solutions, according to some embodiments of the present disclosure.

FIG. 13 illustrates control absorbance experiments of 4.7 nm PbSe nanocrystal solutions. The absorbance spectrum of 4.7 nm PbSe nanocrystals with 24.3% Ag incorporation exhibited nominal changes over 606 days of storage as a powder under inert atmosphere in the dark. These data indicated that the doped PbSe nanocrystals were extremely stable under the conditions tested.

Figure 14A:
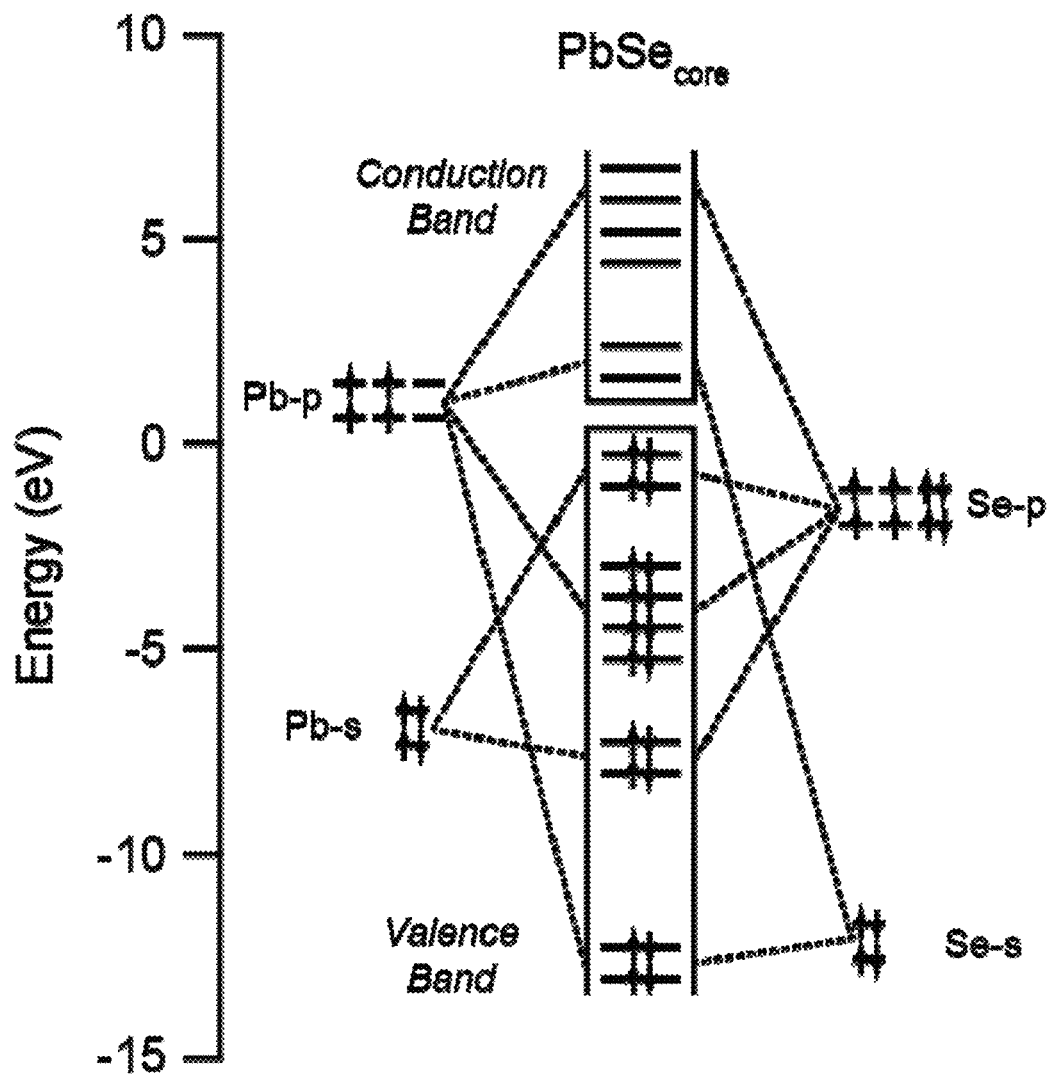
FIGS. 14A and 14B illustrate the orbital character of the band edge region in (FIG. 14 A) PbSe and (FIG. 14B) Ag:PbSe nanocrystal cores, according to some embodiments of the present disclosure.
Figure 14B:
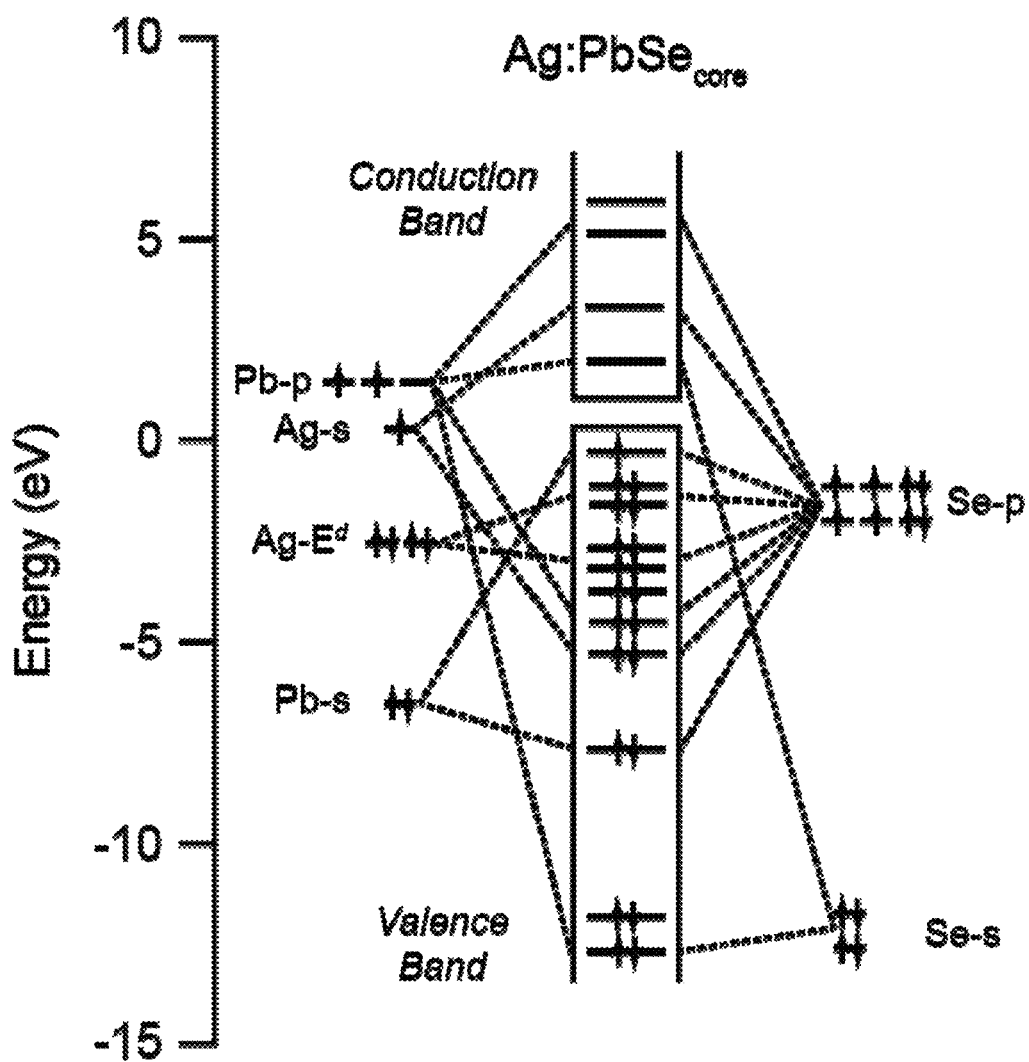

Intuitively, if silver atoms (one valence electron) were to substitutionally replace lead atoms (two valence electrons) in the PbSe lattice, silver would dope the nanocrystal p-type, similar to boron doping in silicon. Theoretical calculations of bulk Ag:PbSe where $Ag^+$ substitutes for $Pb^{2+}$ on the PbSe lattice shows the formation of an acceptor level that causes a lowering of the Fermi level (p-type doping), which is likely what occurs in the Ag:PbSe nanocrystal system, as well. This concept is illustrated using molecular orbital (MO) theory of a simple 4-atom model. FIG. 14A shows a simplified MO diagram of $Pb_2Se_2$, representing the electronic structure of an as-synthesized PbSe nanocrystal core. Taking into account s-p orbital interactions, the highest occupied molecular orbital (HOMO; valence band) arises from interactions between the Pb-s and Se-p states, and the lowest unoccupied molecular orbital (LUMO; conduction band) arises from interactions between the Se-s and Pb-p states. FIG. 14B shows a simplified MO diagram of $AgPbSe_2$, representing the nanocrystal core when silver is substituted for lead. The Ag-related atomic orbitals of interest are the Ag-s and Ag-d orbitals, which both interact with the Se-p orbitals. Specifically, the Ag-s orbital introduces a bonding and antibonding state in the valence band and conduction band, respectively. In a cubic PbSe lattice, the five-fold degenerate Ag-d orbitals split into three lower energy $T_1^d$ states and two $E^d$ states due to splitting of the octahedral crystal field. The $T_1^d$ states weakly couple with the Se-p states, but the $E^d$ state couples more strongly, introducing antibonding states near the Pb—Se HOMO (valence band edge). In an atomic lattice with many PbSe units, these Ag—Se states form localized impurity states.

Figure 20:
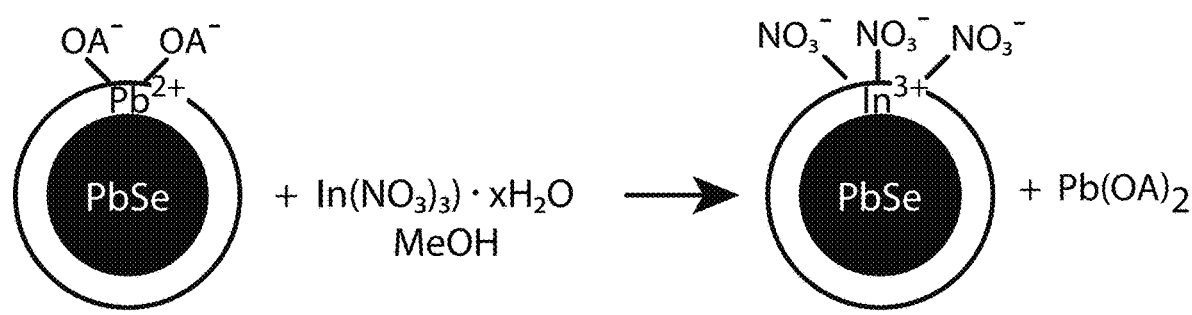
FIG. 20 illustrates a scheme for a proposed mechanism for incorporating $In^{3+}$ into PbSe nanocrystals, according to some embodiments of the present disclosure.

FIG. 20 illustrates a proposed mechanism for incorporating $In^{3+}$ into the lattice of a PbSe starting nanocrystal. In this proposed mechanism, a Z-type ligand exchange may occur where $In(NO_3)_3$ replaces $Pb(OA)_2$ at the surface of the nanocrystal. Once on the surface of the nanocrystal, an $In^{3+}$ cation can diffuse into the lattice and replace one of the $Pb^{2+}$ cations in the lattice.

Figure 15A:
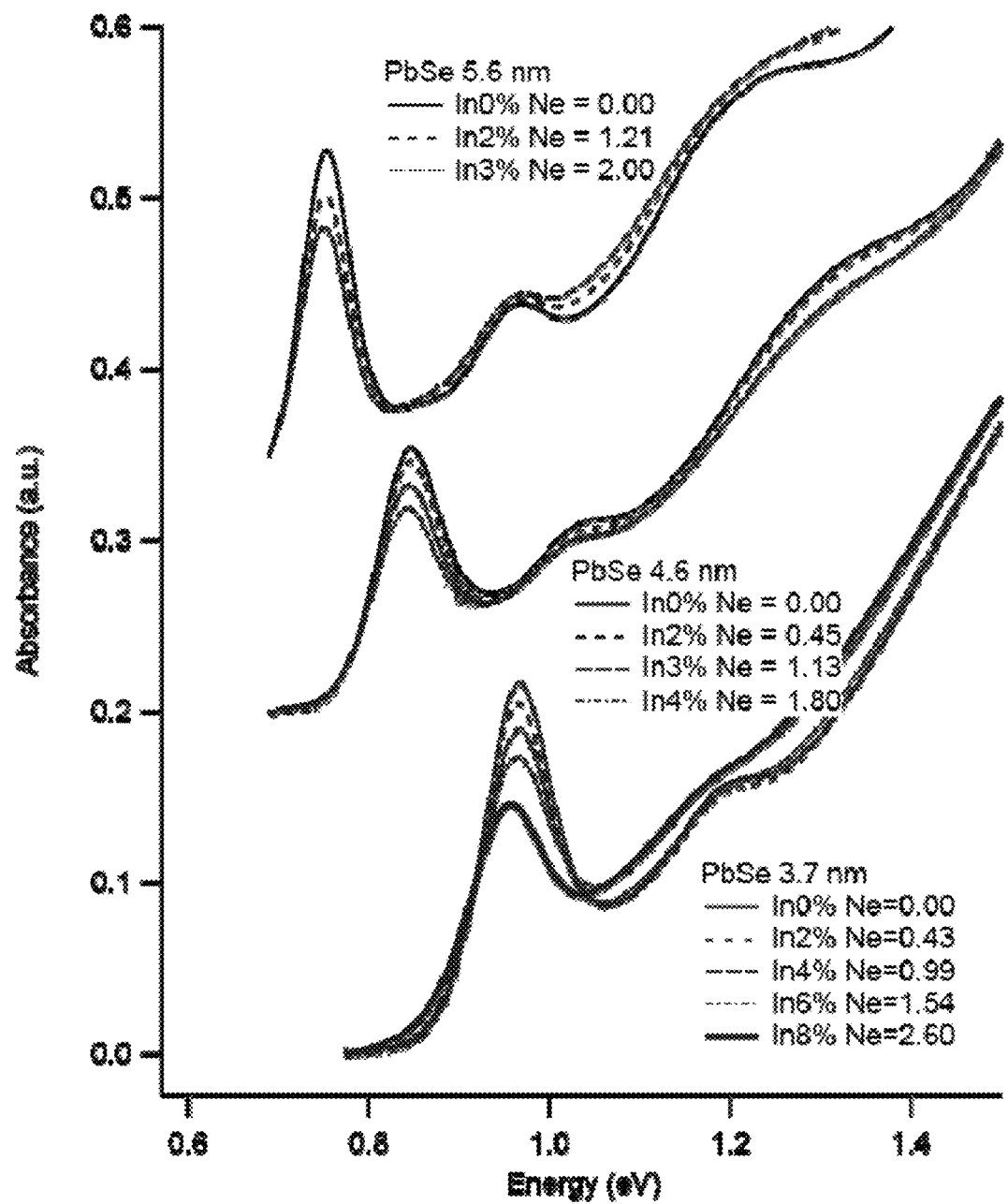
FIGS. 15A, 15B, and 15C illustrate experimental results, which demonstrate the exchange of lead cations in the lattice structure of PbSe nanocrystals with indium cations, according to some embodiments of the present disclosure.
Figure 15B:
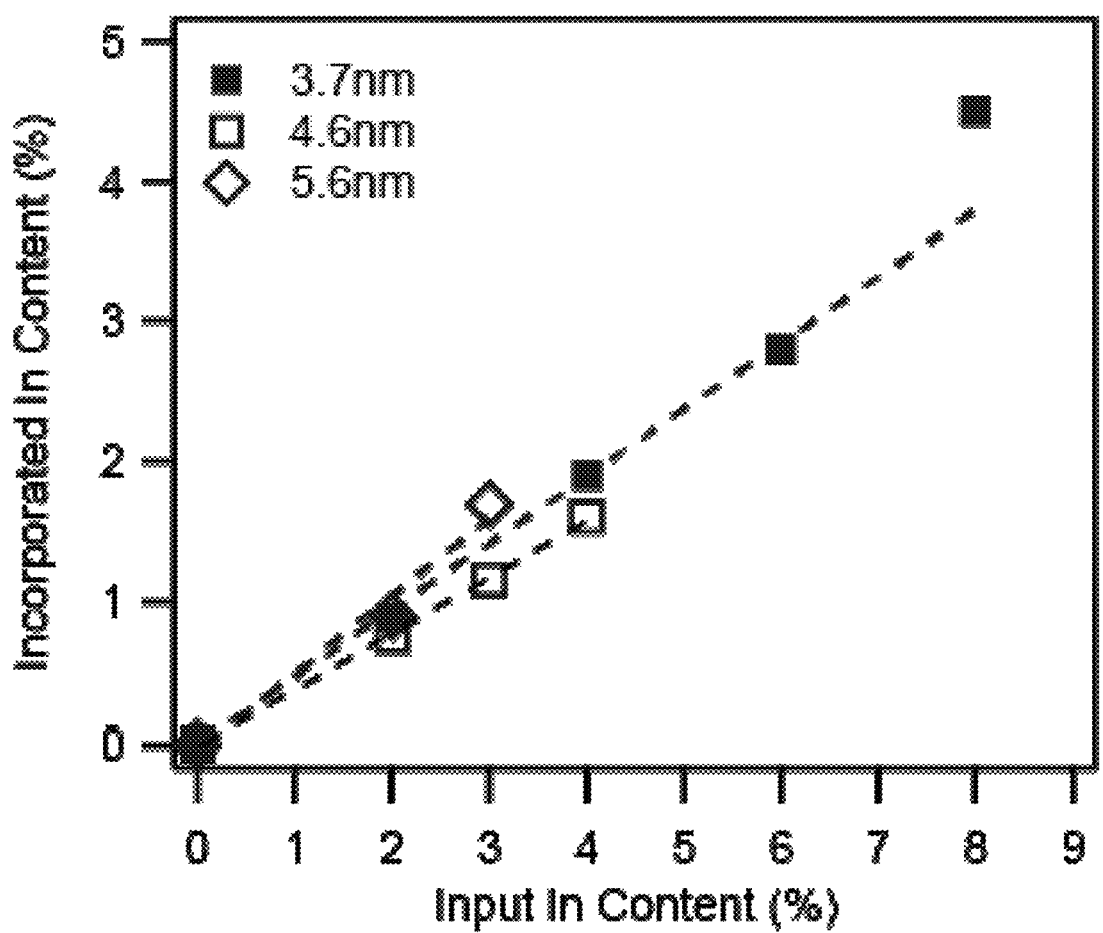
Figure 15C:
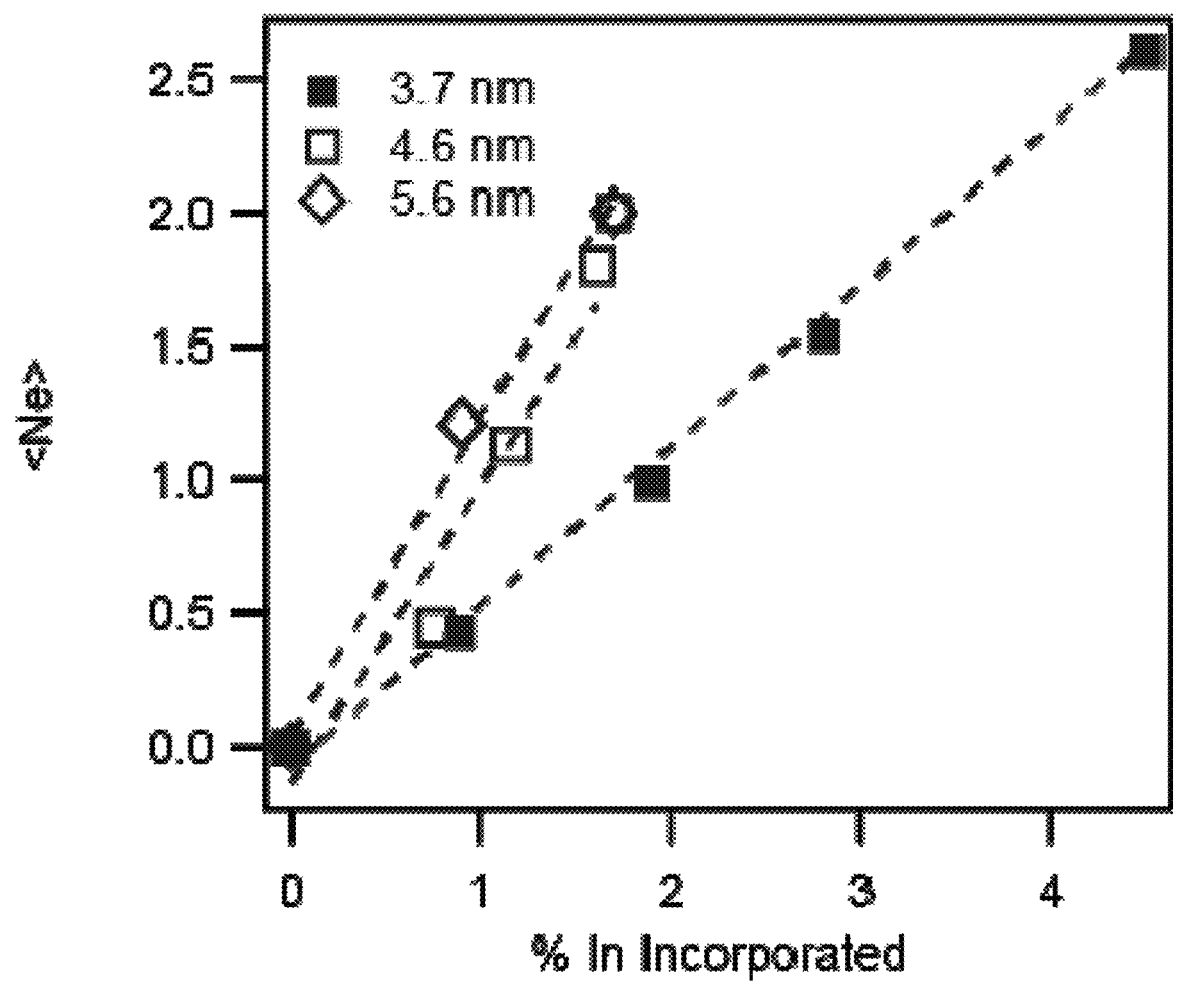
Figure 16:
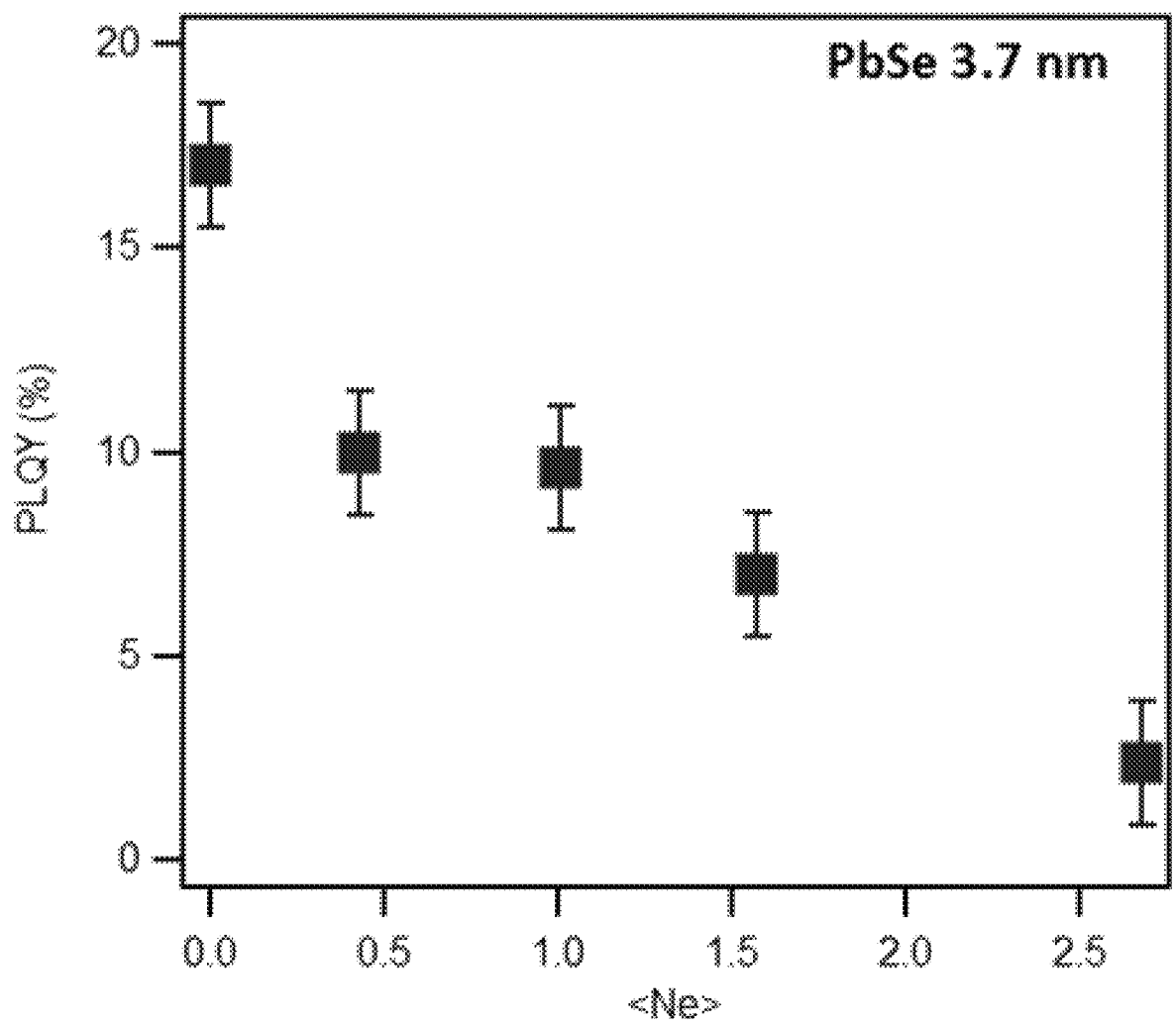
FIG. 16 illustrates a decrease in PLQY which corresponds to the number of delocalized carries increasing due to increased Auger recombination channel, for the exchange of lead cations with indium cations in PbSe nanocrystals, according to some embodiments of the present disclosure.

Experimental data appear to validate the feasibility of the scheme shown in FIG. 20, as shown in FIGS. 15A, 15B, and 15C. Increasing the amount of $In^{3+}$ caused an increasing amount of bleaching of the $1^{st}$ exciton transition of the PbSe nanocrystals. Assuming an eight-fold degenerate $1^{st}$ exciton transition the amount of bleaching is related to the number of delocalized carriers that are added to the conduction band. Three sizes of PbSe nanocrystals were tested, 3.7 nm, 4.6 nm, and 5.6 nm. FIG. 15B shows the amount of $In^{3+}$ that was incorporated into the lattice corresponds to the amount of $In^{3+}$ added to the pure PbSe QDs. FIG. 15C shows the number of delocalized carriers as a function of In incorporation. The successful exchange of lead cations in the PbSe nanocrystals with indium cations is further validated by the decrease of PLQY as shown in FIG. 16.

Figure 17A:
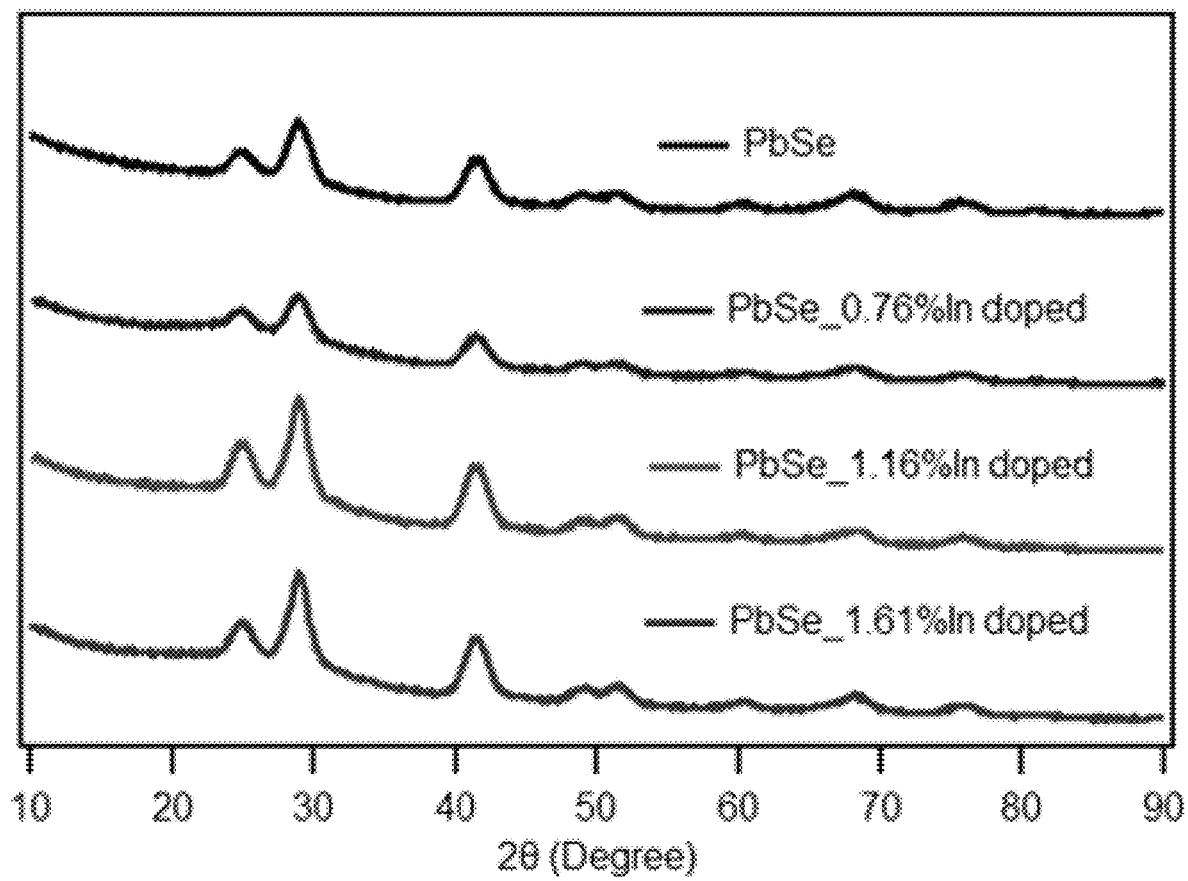
FIGS. 17A and 17B illustrate XRD data resulting from the exchange of lead cations in PbSe nanocrystals with indium cations, according to some embodiments of the present disclosure.
Figure 17B:
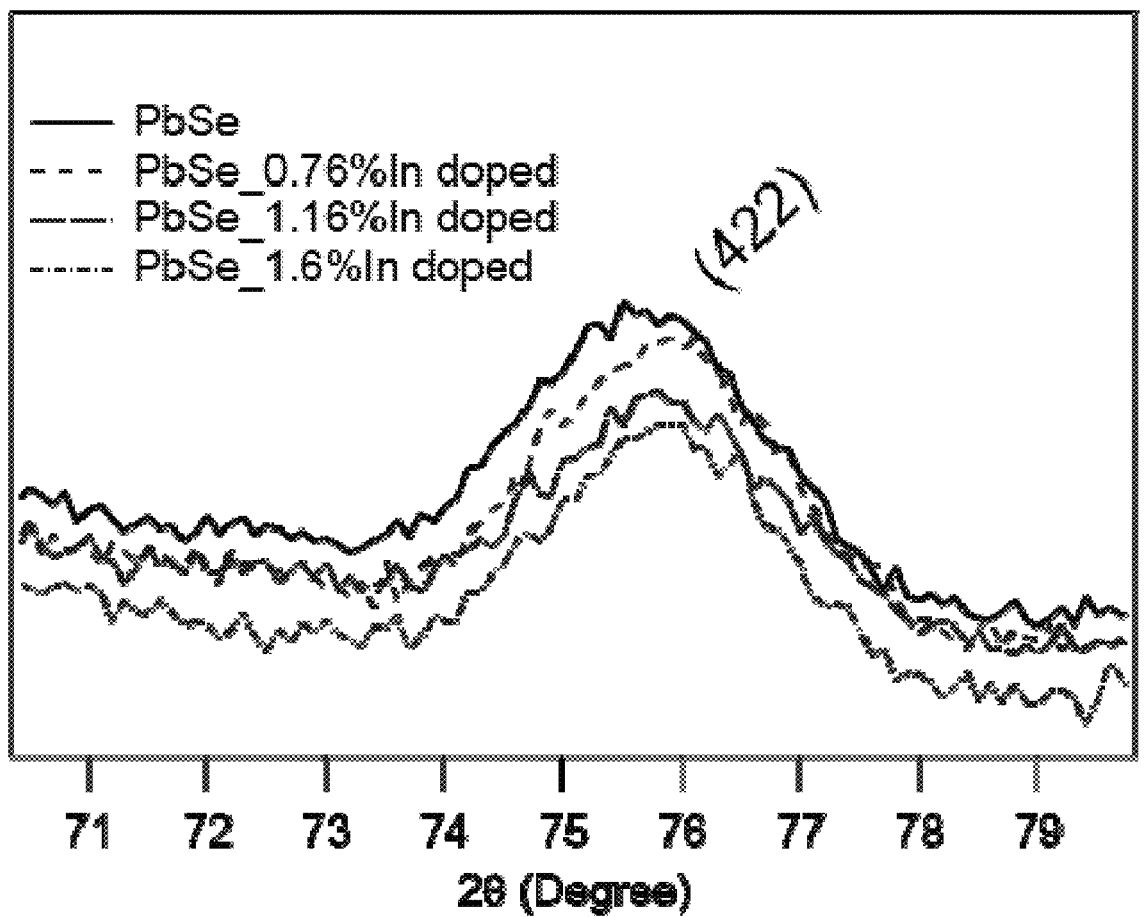
Figure 18A:
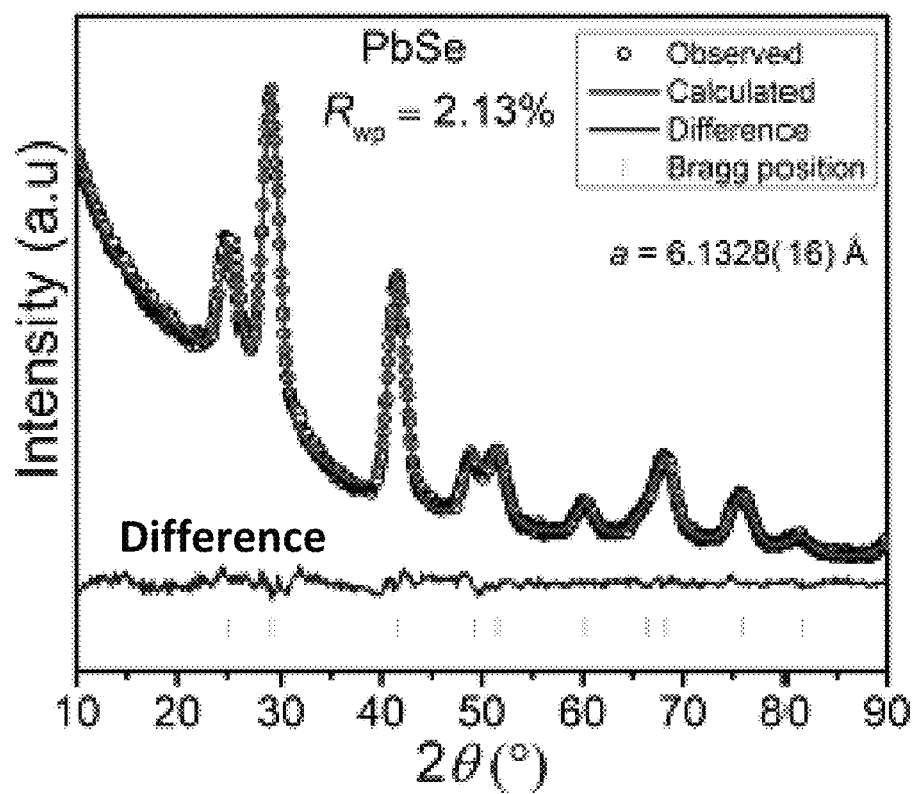
FIGS. 18A-18D illustrate Reitveld refinements of the XRD patterns illustrated in FIGS. 17A and 17B.
Figure 18B:
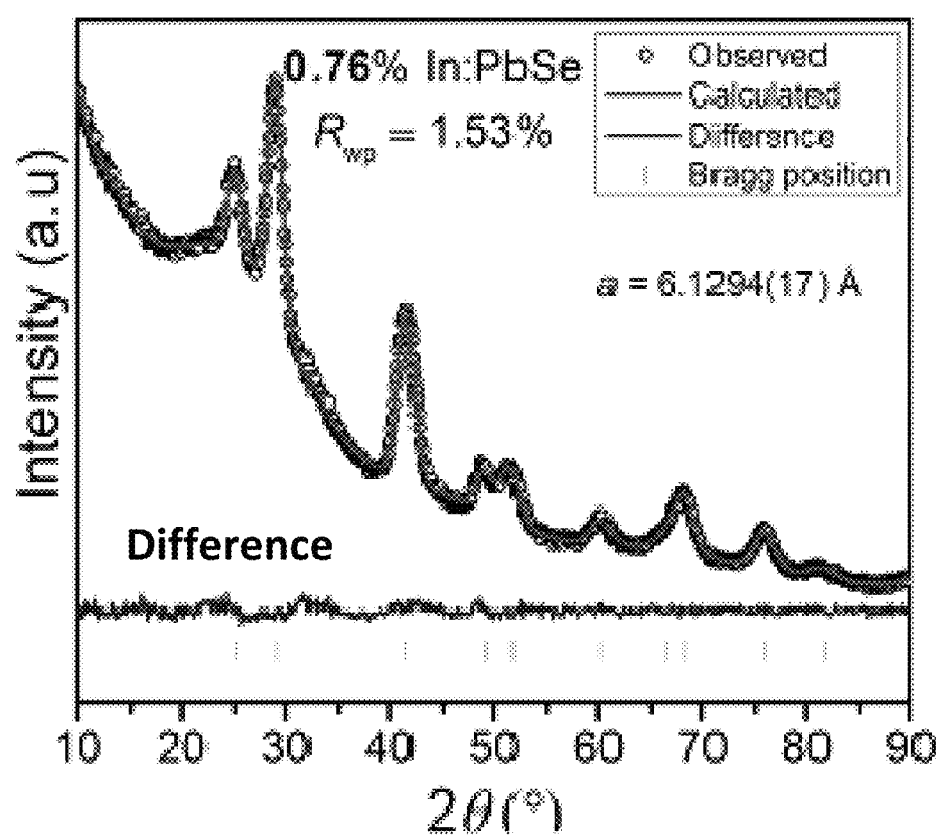
Figure 18C:
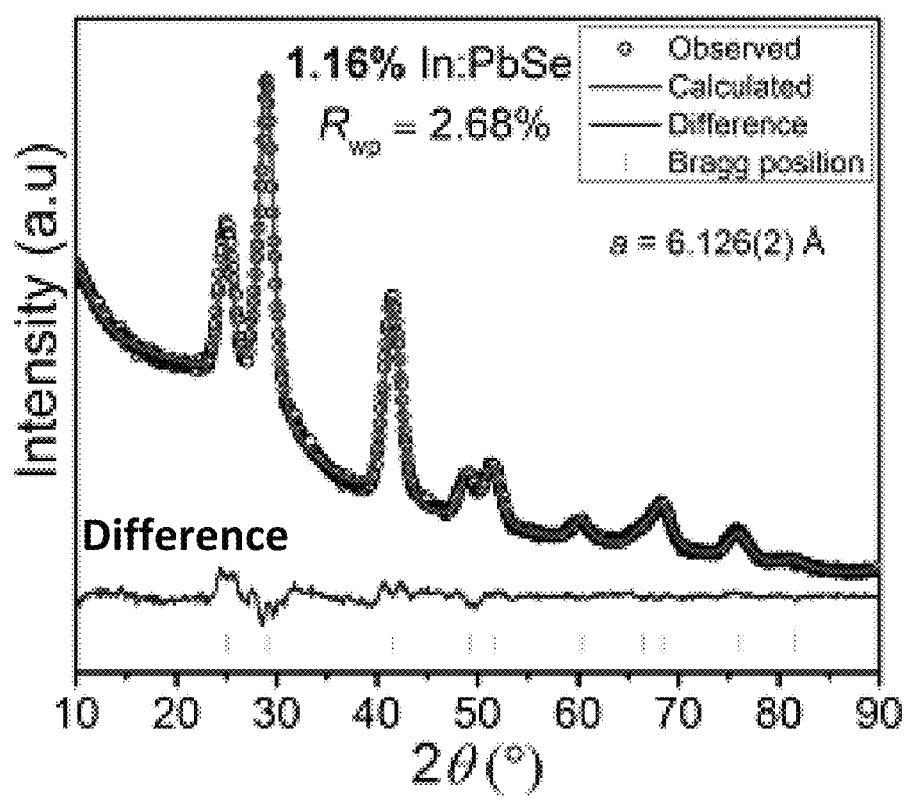
Figure 18D:
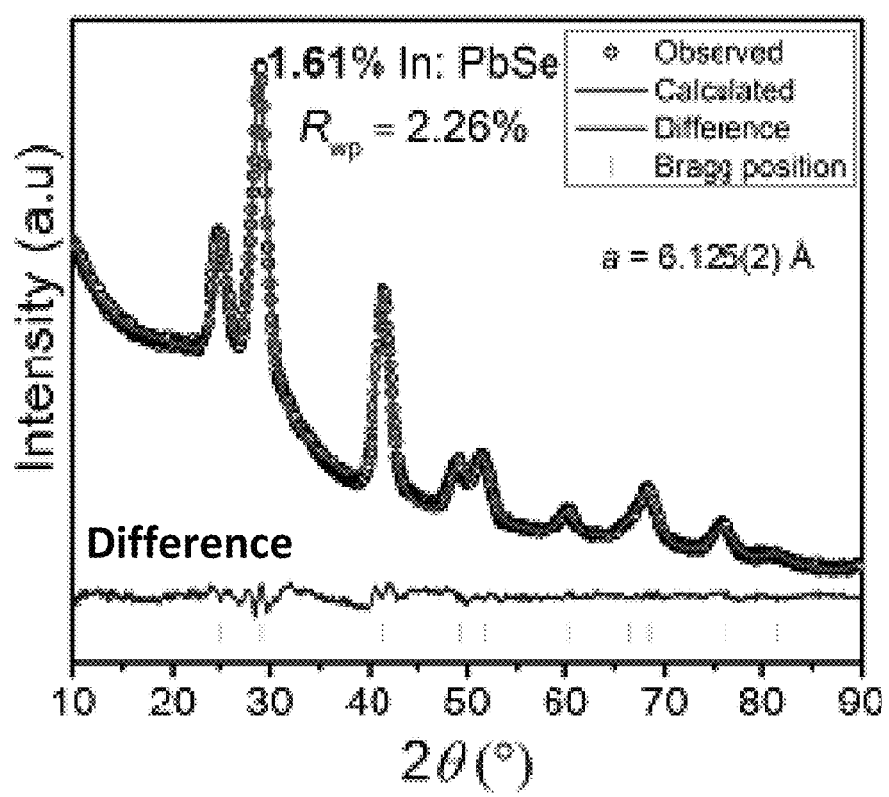
Figure 18E:
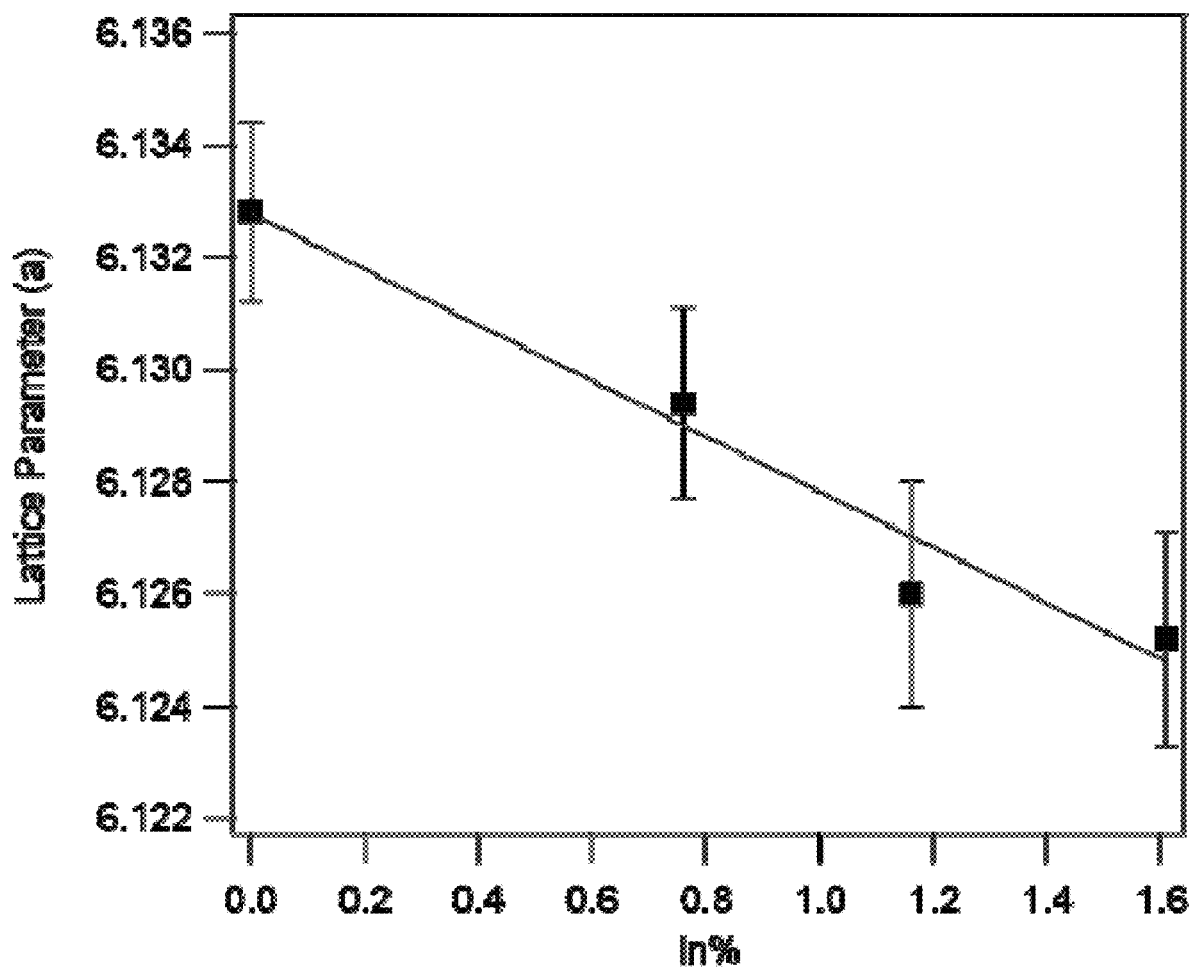
FIG. 18E summarizes the data of FIGS. 18A-18D, illustrating that the lattice parameter of the PbSe nanocrystals is substantially reduced with increased incorporation of the indium into the PbSe nanocrystals.

FIGS. 17A and 17B illustrate the changes to XRD patterns resulting from the increased doping of indium in PbSe nanocrystals; e.g. resulting from the replacement of lead cations with indium cations. FIG. 17B illustrates that the 422 peak shifts to higher angles suggesting that the lattice constant decreases upon incorporation of indium. Thus, the lattice is contracting when indium replaces lead. If indium had incorporated as an interstitial dopant the lattice constant should increase and not decrease. Finally, as illustrated in FIGS. 18A-18D, Reitveld refinement of the XRD patterns shown in FIGS. 17A and 17B yields the variation of the lattice constant with incorporation of indium into the PbSe nanocrystals. FIG. 18E clearly demonstrates that the lattice constant of the PbSe nanocrystals decreased in accordance with a substitutional doping mechanism of the indium cations into the PbSe nanocrystals.

Materials and Methods:

Materials: All chemicals were used as received without further purification. Selenium (99.99%), oleic acid (OAc, 90%), diphenylphosphine (DPP, 98%), trioctylphosphine (TOP, 90%), 1-octadecene (ODE, 90%), silver nitrate (99+%), cadmium nitrate tetrahydrate (trace metals basis, 99.999%), lead nitrate (trace metals basis, 99.999%), 1,2-ethanedithiol (EDT, ≥98%), anhydrous ethanol (EtOH, 200 proof, ≥99.5%), Nitric Acid (TraceSELECT®, ≥69.0%), ultrapure water (TraceSelect® Ultra), anhydrous hexane (≥99%), anhydrous acetonitrile (99.8%), and anhydrous tetrachloroethylene (TCE, ≥99.9%) were purchased from Aldrich and used as received. Lead oxide (99.999%) was purchased from Alfa Aesar.

Nanocrystal synthesis and purification: PbSe nanocrystals were synthesized and purified using standard air-free techniques. In a typical synthesis, a solution of 1.015 g PbO, 4.008 g oleic acid, and 11.586 g ODE was degassed in a three-neck flask under vacuum and heated to 120° C. for 1 hour. Fifteen milliliters of a 1 M solution of TOP-Se containing 0.15 g DPP was then rapidly injected into the hot Pb solution. The nanocrystals were grown for 1-5 minutes, and the reaction was quenched with a water bath and injection of 20 mL of room temperature hexanes. The nanocrystals were purified by two rounds of dispersion/precipitation in hexane/ethanol and stored in a $N_2$ filled glovebox as a powder.

Doping of PbSe nanocrystals: To estimate the Pb content in each sample, the nanocrystals were treated as perfectly spherical and stoichiometric particles. The total number of Pb atoms per nanocrystal can be estimated by dividing the nanocrystal volume, $4/3\pi r^3$ where r is the nanocrystal radius determined from absorption spectroscopy, by the volume of the PbSe rock salt unit cell, $a^3$, where a is the PbSe lattice constant, and multiplying by the number of Pb atoms per unit cell (4 atoms). The concentration of nanocrystals per sample can be determined from absorption spectroscopy to then calculate the total number of lead atoms per sample.

Nanocrystal film deposition: Thin films of PbSe nanocrystals were deposited via spincoating. PbSe nanocrystal solutions (~20 mg/mL) were pipetted onto Au coated glass substrates and spun at 5000 RPM for 30 seconds. The substrates were then submerged in 1 mM EDT in acetonitrile for 30 seconds to remove native oleate ligands. This process was repeated for a total of four cycles to build up a sufficiently thick, conductive film for fourier transform infrared (FT-IR) spectroscopy and photoelectron spectroscopy. Oleate-capped PbSe nanocrystal films for XRD were deposited via dropcasting from concentrated stock hexane solutions.

Quantitative $^1$H NMR: Quantitative $^1$H NMR measurements of starting nanocrystal and doped Ag:PbSe nanocrystals were taken in CDCl$_3$. Surface bound oleate ligand density was estimated using a combination of UV-Vis-NIR and $^1$H NMR spectra. First, the concentration of a TCE solution of nanocrystals was standardized using UV-Vis-NIR absorbance at 400 nm. The addition of a known amount of ferrocene (10 H's) as an internal standard to the nanocrystal NMR sample allowed us to estimate the total number of surface bound oleate ligands using the well-resolved vinyl proton peak. $^1$H NMR spectra were recorded on a Bruker Avance III 400 MHz instrument and acquired with sufficiently long delay to allow complete relaxation between pulses (30 seconds).

Optical characterization: Optical absorbance spectra were collected using a Cary 500 UV-Vis-NIR spectrometer. Photoluminescence quantum yield (PL QY) measurements were made using an established method. Nanocrystals were dispersed in TCE with an absorbance of less than 0.1 OD to minimize reabsorption effects. The measurements were taken in a LabSphere integration sphere with an 850 nm NIR-LED (ThorLabs M850L3) excitation source passed through an 850 nm centered 40 nm band-pass filter. Light from the sphere was fiber coupled to a home-built fluorescence spectrometer consisting of a 900 nm long-pass filter, monochromator (PTI), and a two-stage thermocouple-cooled extended InGaAs detector. The excitation LED was driven by a 15 V square wave at 25 Hz using a Stanford Research Systems (SRS) DS335 function generator. The detector signal was amplified using a SRS SR530 lock-in amplifier, and all spectra were corrector for grating, fiber, integration sphere, and detector deficiencies using a calibrated lamp. The PL QY was calculated using:

$$PLQY = \frac{\int I_{sample}(\lambda) - I_{ref}(\lambda) d\lambda}{\int E_{ref}(\lambda) - E_{sample}(\lambda) d\lambda}$$

where 'I' indicates the measured intensity of the emitted light, 'E' indicates the measured intensity of the excitation light, 'sample' indicates measurements of nanocrystals, and 'ref' indicates measurements of a reference cuvette (contains pure solvent, TCE, without nanocrystals). X-ray diffraction (XRD) was performed on a Bruker D8 Discover diffractometer using Cu K$\alpha$ radiation ($\lambda$=1.54 Å). FT-IR absorbance measurements were taken on a Thermo-Nicolet 6700 FT-IR spectrometer in transmission mode with a resolution of 4 cm$^{-1}$. Clean Si plates were used for background measurements, and films of oleate capped nanocrystals were drop cast onto the Si plates from hexane and sealed in a nitrogen filled glovebox. Spectra with sloping baselines were baseline-corrected. Elemental analysis was performed using inductively coupled plasma mass spectrometry on an Agilent 7700 ICP-MS. Samples were digested using concentrated nitric acid and diluted with ultrapure water for analysis. High-resolution transmission electron microscopy was performed using an FEI Tecnai G2 ST20 TEM operating at 200 kV. XRF spectroscopy was measured on a Fischerscope X-Ray XDV-SDD system equipped with a tungsten anode and a Peltier-cooled silicon drift detector. For each sample, the oleate capped nanocrystals were drop cast from solution onto a silicon substrate. The composition was quantified using the provided WinF™ software and the average of three measurements is reported per sample.

Photoelectron spectroscopy: XPS measurements were performed on a Physical Electronics, Inc. 5600 ESCA instrument. Briefly, the radiation was produced by a monochromatic Al (K$\alpha$) source centered at 1486.6 eV. The valence band spectra were taken with a step size of 0.05 eV and a pass energy of 5.85 eV. The electron binding energy scale was calibrated using the Fermi edge of cleaned metallic substrates (Au, Mo, Cu, and/or Ag), giving the spectra an uncertainty of ±0.05 eV. The correction depends on the band gap ($E_g$=optical band gap+ exciton binding energy); the correction to the onset of photoelectron intensity is correction=0.382−0.226($E_g$). For this study, the optical band gap and exciton binding energy of the starting PbSe nanocrystals is 0.86 and 0.03 eV, respectively, which gives $E_g$=0.89 eV and a correction of 0.181 eV. Therefore, ($E_F$−$E_{VBM}$)=($E_F$−$E_{onset}$)−(0.156 eV) for the PbSe nanocrystal films used in this study.

Transient absorption (TA): Femtosecond TA spectra were collected using a home-built instrument. A Continuum Integra-C regeneratively amplified Ti: sapphire laser with ~3.5 W, 1 kHz, and ~100 fs pulse width output at 800 nm was split into two beams; pump and probe. The pump beam was directed into a Palitra-Duo-FS:FS optical parametric amplifier that was capable of producing excitation wavelengths from 270-22,000 nm and was modulated at 500 Hz through an optical chopper to block every other laser pulse. The probe beam passed through a multipass delay stage that achieved up to ~4.5 ns of pump-probe delay, and was focused onto a sapphire crystal to produce a broadband Vis-NIR spectrum from 800-1600 nm. The probe was passed through a continuously variable neutral density filter and a fraction was picked off to be used as a reference that accounts for probe beam intensity fluctuations. The pump and probe beams were then overlapped at the sample, which was vigorously stirred to eliminate photocharging effects. NIR photodiode arrays (Ultrafast Systems) were used to detect the probe and reference beams for data acquisition. Sub-nanosecond TA measurements were performed using an Ultrafast Systems LLC EOS Spectrometer.

The foregoing discussion and examples have been presented for purposes of illustration and description. The foregoing is not intended to limit the aspects, embodiments, or configurations to the form or forms disclosed herein. In the foregoing Detailed Description for example, various features of the aspects, embodiments, or configurations are grouped together in one or more embodiments, configurations, or aspects for the purpose of streamlining the disclosure. The features of the aspects, embodiments, or configurations, may be combined in alternate aspects, embodiments, or configurations other than those discussed above. This method of disclosure is not to be interpreted as reflecting an intention that the aspects, embodiments, or configurations require more features than are expressly recited in each claim. Rather, as the following claims reflect, inventive aspects lie in less than all features of a single foregoing disclosed embodiment, configuration, or aspect. While certain aspects of conventional technology have been discussed to facilitate disclosure of some embodiments of the present invention, the Applicants in no way disclaim these technical aspects, and it is contemplated that the claimed invention may encompass one or more of the conventional technical aspects discussed herein. Thus, the following claims are hereby incorporated into this Detailed Description, with each claim standing on its own as a separate aspect, embodiment, or configuration.

What is claimed is:

1. A composition comprising:
   a first element;
   a second element;
   a third element;
   a ligand; and
   an anion, wherein:
   the first element and the second element form a nanocrystal comprising a surface and a crystal lattice,
   the nanocrystal further comprises at least one of lead selenide, lead sulfide, lead telluride, cadmium sulfide, cadmium selenide, cadmium telluride, indium phosphide, indium nitride, indium arsenide, indium antimonide, zinc sulfide, zinc selenide, zinc telluride, mercury sulfide, mercury selenide, or mercury telluride,
   a first portion of the third element covers at least a portion of the surface in the form of a layer,
   a second portion of the third element is incorporated into the crystal lattice, and
   the ligand and the anion are ionically bound to at least one of the second element or the first portion of the third element.

2. The composition of claim 1, wherein the crystal lattice comprises at least one of a rock salt unit cell, a wurzite unit cell, a zinc blende unit cell, or a sphalerite unit cell.

3. The composition of claim 1, wherein the third element comprises at least one of silver, sodium, potassium, rubidium, magnesium, calcium, strontium, copper, gold, zinc, cadmium, mercury, gallium, indium, thallium, germanium, or silicon.

4. The composition of claim 1, wherein the layer has a thickness of about a monolayer thickness of the third element.

5. The composition of claim 1, wherein the first portion of the third element is present on the surface at a first concentration between greater than 0 mol % and 30 mol %.

6. The composition of claim 1, wherein the second portion of the third element is present in the nanocrystal at a second concentration between greater than 0 mol % and 0.5 mol %.

7. The composition of claim 1, wherein the nanocrystal has an average diameter between 2 nm and 40 nm.

8. The composition of claim 7, wherein the average diameter is between about 3 nm and 15 nm.

9. The composition of claim 1, wherein the anion comprises at least one of a nitrate, phosphate, chloride, iodide, bromide, sulfate, sulfite, nitrite, chlorite, acetate, formate, hydroxide, perchlorate, chlorate, thiosulfate, phosphite, carbonate, hydrogen carbonate, oxalate, cyanate, cyanide, isocyanate, thiocyanate, chromate, dichromate, permanganate, tetrafluoroborate, or citrate.

10. The composition of claim 1, wherein the anion is present at a first surface coverage between greater than zero anion/nm$^2$ and 3.5 anions/nm$^2$.

11. The composition of claim 1, wherein the ligand comprises at least one of oleate, myristate, cinnamate, stearate, oleylamine, trioctylphosphine, or trioctylphosphine oxide.

12. The composition of claim 1, wherein the ligand is present at a second surface coverage between 0.1 ligands/nm$^2$ and 4.0 ligands/nm$^2$.

13. The composition of claim 1, wherein the nanocrystal exhibits a Fermi level shift towards a valence band maximum or towards a conduction band minimum with an increased incorporation of the third element, as measured by XPS/UPS.

14. The composition of claim 1, wherein the nanocrystal absorbance exhibits an increasing bleach of a first exciton transition and a growth of a low-energy intraband transition with an increased incorporation of the third element, as measured by at least one of UV-Vis or FTIR absorbance.

15. The composition of claim 1, wherein the nanocrystal has a characteristic length between 0.5 nm and 100 nm.

16. A composition comprising:
    a nanocrystal comprising PbSe comprising a surface and a rock salt crystal lattice;
    a layer comprising silver or indium at least partially covering the surface;
    an anion comprising at least one of a nitrate, phosphate, chloride, iodide, bromide, sulfate, sulfite, nitrite, chlorite, acetate, formate, hydroxide, perchlorate, chlorate, thiosulfate, phosphite, carbonate, hydrogen carbonate, oxalate, cyanate, cyanide, isocyanate, thiocyanate, chromate, dichromate, permanganate, tetrafluoroborate, or citrate; and
    a ligand comprising at least one of oleate, myristate, cinnamate, stearate, oleylamine, trioctylphosphine, or trioctylphosphine oxide, wherein:
    the ligand and the anion are ionically bound to at least the layer,
    the nanocrystal has a characteristic length between 3 nm and 10 nm,
    a concentration of at least one of silver and indium is present in the crystal lattice between greater than 0 mol % and 0.5 mol %, and
    the concentration is present in the form of at least one of silver cations or indium cations.

17. The composition of claim 16, wherein the ligand comprises oleate at a surface coverage between 0.5 ligands/nm$^2$ and 4.0 ligands/nm$^2$.

* * * * *